United States Patent
Suga et al.

(10) Patent No.: US 8,654,382 B2
(45) Date of Patent: Feb. 18, 2014

(54) PRINTING APPARATUS AND CONTROL METHOD THEREOF, AND PRINTING SYSTEM

(75) Inventors: Akira Suga, Tokyo (JP); Hideaki Kawamura, Kanagawa (JP); Satoshi Ogiwara, Kanagawa (JP); Takashi Aizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 12/848,069

(22) Filed: Jul. 30, 2010

(65) Prior Publication Data

US 2010/0295950 A1  Nov. 25, 2010

Related U.S. Application Data

(63) Continuation of application No. 10/984,783, filed on Nov. 10, 2004, now Pat. No. 8,274,675, which is a continuation of application No. PCT/JP03/07011, filed on Jun. 3, 2003.

(30) Foreign Application Priority Data

Jun. 4, 2002  (JP) .................................. 2002-163428
Jun. 4, 2002  (JP) .................................. 2002-163430

(51) Int. Cl.
*G06F 3/12* (2006.01)
*H04N 5/225* (2006.01)
*H04N 5/76* (2006.01)

(52) U.S. Cl.
USPC ................... 358/1.15; 348/207.1; 348/207.2; 348/231.6; 358/1.14

(58) Field of Classification Search
USPC ................... 358/1.1–1.9, 1.11–1.18
See application file for complete search history.

(56) References Cited

U.S. PATENT DOCUMENTS 6,055,361 A   4/2000 Fujita et al.
6,094,221 A * 7/2000 Andersion ................. 348/231.6

(Continued)

FOREIGN PATENT DOCUMENTS

EP   0869656 A2   10/1998
GB   2328104      2/1999

(Continued)

OTHER PUBLICATIONS

Anonymous:"PIMA 15740:2000" 2000, Harrison, NY, USA Retrieved from the Internet:URL:http://www.broomscloset.com/closet/photo/exif/PIMA15740-2000.PDF [retrieved on Oct. 27, 2010].

(Continued)

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

This invention has as its object to allow an authentication process that avoids unnecessary information from being stored in a digital camera irrespective of whether or not a digital camera connected to the printer has a direct print function. To this end, in this invention, in an early stage of connection between a digital camera DSC and PD printer, the PD printer side requests an object which contains a keyword as authentication information of those which are stored and held by the DSC (S29). As a result, after it is determined the returned information contains authentication information, the printer notifies the DSC of its own authentication information (S33).

8 Claims, 27 Drawing Sheets

(56) References Cited

U.S. PATENT DOCUMENTS

| | | | |
|---|---|---|---|
| 6,104,886 A | 8/2000 | Suzuki | |
| 6,111,605 A | 8/2000 | Suzuki | |
| 6,134,200 A | 10/2000 | Timmermans | |
| 6,380,975 B1 | 4/2002 | Suzuki | |
| 6,504,960 B2 * | 1/2003 | Takahashi | 382/305 |
| 6,618,553 B1 | 9/2003 | Shiohara | |
| 6,683,996 B1 | 1/2004 | Walmsley | |
| 6,741,271 B1 | 5/2004 | McConica et al. | |
| 6,806,978 B1 | 10/2004 | Tamura et al. | |
| 7,038,714 B1 * | 5/2006 | Parulski et al. | 348/207.2 |
| 7,106,461 B2 | 9/2006 | Kakigi et al. | |
| 7,170,627 B2 | 1/2007 | Tanaka et al. | |
| 7,207,735 B2 * | 4/2007 | Narusawa et al. | 400/76 |
| 7,224,480 B2 | 5/2007 | Tanaka et al. | |
| 7,375,742 B2 | 5/2008 | Aizawa | |
| 7,414,746 B2 | 8/2008 | Tanaka et al. | |
| 7,564,576 B2 | 7/2009 | Kato et al. | |
| 2001/0040685 A1 | 11/2001 | Winter et al. | |
| 2001/0045966 A1 | 11/2001 | Inoue et al. | |
| 2002/0021902 A1 | 2/2002 | Hosoda et al. | |
| 2002/0054344 A1 | 5/2002 | Tateyama | |
| 2002/0130956 A1 | 9/2002 | Suzuki | |
| 2002/0176109 A1 | 11/2002 | Matsumoto | |
| 2003/0122932 A1 | 7/2003 | Shiohara | |
| 2003/0122933 A1 | 7/2003 | Shiohara | |
| 2003/0122934 A1 | 7/2003 | Shiohara | |
| 2003/0122935 A1 | 7/2003 | Shiohara | |
| 2003/0206316 A1 | 11/2003 | Anderson et al. | |
| 2003/0210418 A1 | 11/2003 | Aizawa | |
| 2003/0222985 A1 | 12/2003 | Goto et al. | |
| 2004/0021902 A1 | 2/2004 | Ogiwara et al. | |
| 2004/0036895 A1 | 2/2004 | Yano et al. | |
| 2004/0046990 A1 | 3/2004 | Yano et al. | |
| 2004/0109062 A1 | 6/2004 | Yamaya | |
| 2004/0179103 A1 | 9/2004 | Endo et al. | |
| 2004/0179105 A1 | 9/2004 | Endo et al. | |
| 2004/0184078 A1 | 9/2004 | Endo et al. | |
| 2004/0189810 A1 | 9/2004 | Aizawa | |
| 2004/0252340 A1 | 12/2004 | Komagamine et al. | |
| 2005/0052676 A1 | 3/2005 | Masumoto et al. | |
| 2005/0052690 A1 | 3/2005 | Masumoto et al. | |
| 2005/0088689 A1 | 4/2005 | Suga et al. | |
| 2006/0044395 A1 | 3/2006 | Aichi et al. | |

FOREIGN PATENT DOCUMENTS

| | | |
|---|---|---|
| GB | 2328104 A | 2/1999 |
| JP | 11/88744 A | 7/1989 |
| JP | 8-032911 A | 2/1996 |
| JP | 9-139876 A | 5/1997 |
| JP | 10-108005 A | 4/1998 |
| JP | 10-229490 A | 8/1998 |
| JP | 11-46331 A | 2/1999 |
| JP | 11-55605 A | 2/1999 |
| JP | 11-88744 A | 3/1999 |
| JP | 11-154123 A | 6/1999 |
| JP | 11-161443 | 6/1999 |
| JP | 11-341065 | 12/1999 |
| JP | 2000-99286 A | 4/2000 |
| JP | 2000-118086 A | 4/2000 |
| JP | 2000-137588 A | 5/2000 |
| JP | 2000-152052 A | 5/2000 |
| JP | 2000-99286 A | 10/2001 |
| JP | 2001-290612 A | 10/2001 |
| JP | 2001/333363 A | 11/2001 |
| JP | 2002-142072 A | 5/2002 |
| JP | 2001-33363 A | 8/2002 |
| JP | 2003-143520 A | 5/2003 |
| JP | 2003-175657 A | 6/2003 |
| RU | 2073913 C1 | 2/1997 |
| RU | 96111952 | 9/1998 |
| RU | 10891 U1 | 8/1999 |
| WO | 97/50243 A1 | 12/1997 |

OTHER PUBLICATIONS

European Office Action dated Nov. 8, 2010, corresponding to European Patent Application No. 03730794.9-1522.
Office Action, dated Sep. 24, 2008, in KR 10-2004-7019656.
JP Office Action, dated May 12, 2008, in JP 2005-164869.
U.S. Appl. No. 10/984,807, filed Nov. 10, 2004, Suga, et al.
U.S. Appl. No. 10/968,057, filed Oct. 20, 2004, Ogiwara.

* cited by examiner

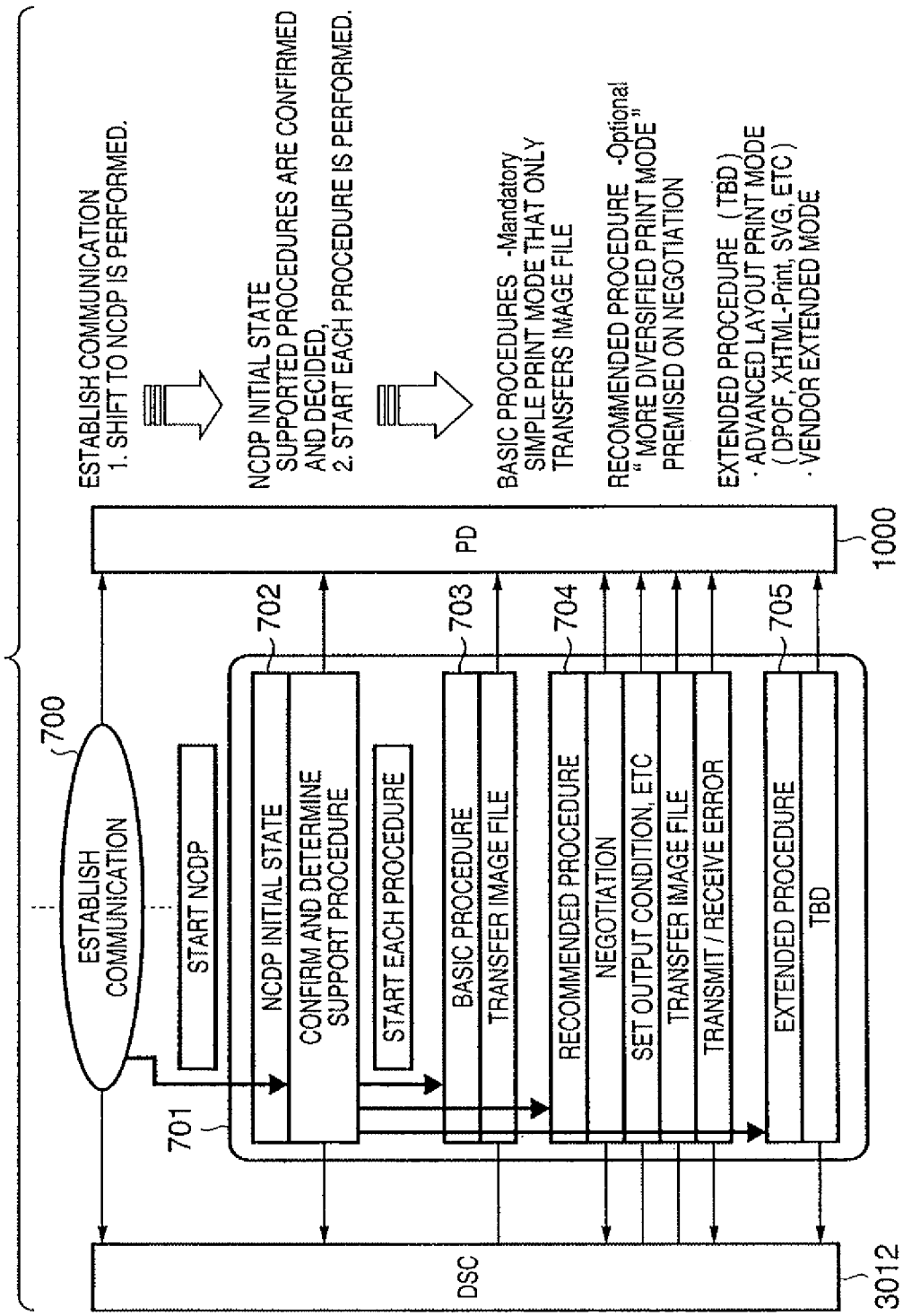

FIG. 8

| SOURCE | FUNCTION NAME | CORRESPONDING MODE | | | FUNCTION |
|---|---|---|---|---|---|
| | | BASIC | RECOMMENDED | EXTENDED | |
| PRINTER | NCDPStart | ○ | ○ | ○ | START NCDP |
| | ProcedureStart | ○ | ○ | ○ | START MODE (BASIC, RECOMMENDED, EXTENDED) |
| | NCDPEnd | ○ | ○ | ○ | TERMINATE FROM NCDP |
| | Capability | | ○ | | NOTIFY PRINTER FUNCTION (IF NEGOTIATION IS REQUIRED) |
| | GetImage | ○ | ○ | | ACQUIRE IMAGE (jpeg, ETC) FROM DSC |
| | StatusSend | | ○ | | NOTIFY ERROR STATUS |
| | PageStart | | ○ | | NOTIFY PRINT START (UPON FEEDING SHEET FOR EACH PAGE) |
| | PageEnd | | ○ | | NOTIFY PRINT END (UPON DISCHARGING SHEET FOR EACH PAGE) |
| | JobEnd | | ○ | | NOTIFY END OF PRINT JOB |
| DSC | JobStart | ○ | ○ | | PRINT COMMAND |
| | JobAbort | | ○ | | PRINT ABORT COMMAND |
| | JobContinue | | ○ | | PRINT RESTART COMMAND |

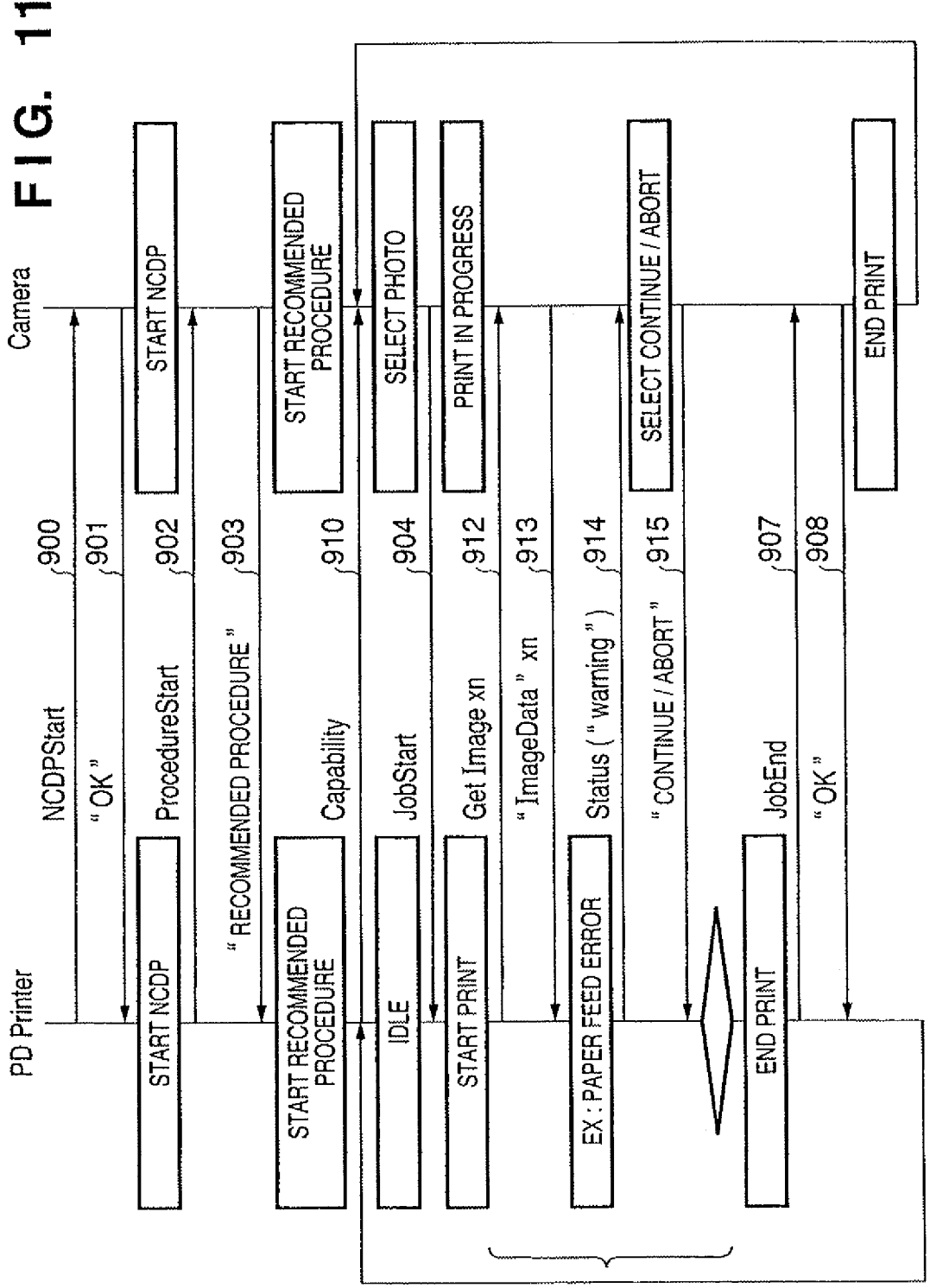

FIG. 12

```
<CAPABILITY>
ITEMS THAT DO NOT REQUIRE NEGOTIATION
  <Quality=Draft, Normal, Fine>
  <PaperSize=L, 2L,Card,Wallet, 4x6, A4, Letter, ...>
  <PaperType=Plain, Photo>
ITEMS THAT REQUIRE NEGOTIATION
  <ImageType=Tiff, Jpeg, BMP, ...>
  <Date=On, Off>
  <FileName = On, Off>
  <Layout=PAPER SIZE / LAYOUT1, ... ,INDEX(NxM)>
  <Layout=L / Borderless,1x1, 1x2, 2x2, INDEX(3x5)>
  <Layout=2L / Borderless,1x1, 1x2, 2x2, INDEX(5x7)>
  <Layout=Card / Borderless,1x1, 1x2, INDEX(2x3)>
  ...
  <Layout=Letter / Borderless,1x1, 1x2, 2x2, 2x4, 4x4, INDEX(8x10)>
  <ImageOptimize=On, Off>
  <SizePerPicture=3MByte>
  <Option>
    <Vender=Ganon, HP, SQNY, ...>
    <ImageOptimize=DiPS, Auto, On, APP, Vivid, Off, ...>
    <Trimming=(X, Y, W, H)>
  ...
  <Option>
</CAPABILITY>
```

DESCRIBE CONTENTS OF CAPABILITY

· OUTPUT QUALITY ( QUICK, NORMAL, FINE )
· DESCRIPTION OF PAPER SIZE
· PAPER TYPE ( NORMAL PAPER, PHOTO DEDICATED PAPER )

· DESCRIPTION OF SUPPORTED IMAGE FORMAT INFORMATION
· DATE OUTPUT ( On, Off )
· FILE NAME OUTPUT ( On, Off )
· DESCRIPTION OUTPUTTABLE LAYOUT CORRESPONDING TO PAPER SIZE

· IMAGE CORRECTION ( On, Off )
· OUTPUTTABLE IMAGE SIZE
· DESCRIPTION OF OPTION
· VENDOR NAME
· VENDOR UNIQUE SPECIFICATION ( IMAGE CORRECTION )
· VENDOR UNIQUE SPECIFICATION ( TRIMMING )

PRINTING APPARATUS AND CONTROL METHOD THEREOF, AND PRINTING SYSTEM

This application is a continuation of U.S. application Ser. No. 10/984,783, filed Nov. 10, 2004 which is a continuation of International Application No. PCT/JP03/07011, filed Jun. 3, 2003, each of which are hereby incorporated by reference in their entirety.

TECHNICAL FIELD

The present invention relates to a printer apparatus and system, which can directly communicate with a digital camera. Note that some recent digital cameras have a function of sensing a moving image. However, since the basic function of a digital camera is at least a still image photographing function, apparatuses having the above function will also be called a digital camera (DSC).

BACKGROUND ART

Normally, upon printing an image sensed by a digital camera, the following processes are required. That is, an image stored in the digital camera is read by a personal computer (to be referred to as a PC hereinafter), and is printed by a connected printer using an application running on the PC.

That is, the flow of image data is DSC→PC→printer, and possession of the PC is indispensable. Also, the PC must be started to print an image stored in a DSC.

In consideration of such situation, some proposals in which a DSC and a printer are directly connected, and a print instruction is issued on a display normally equipped on the DSC (to be referred to as photo direct print hereinafter) have already been made.

Merits of use of the photo direct print system are easy print without starting a PC and low system building cost since a PC is not indispensable. Upon connecting a DSC to a printer, a display normally equipped on the DSC is used as means for giving various instructions and, especially, for confirming an image to be printed. Hence, a printer does not require any special display used to confirm an image, and the cost can be further reduced.

Most of recent DSCs comprise versatile communication means used to connect a PC. Typically, a DSC comprises a USB (Universal Serial Bus). Upon connection using this USB, a communication is established while defining the DSC as a slave and the PC as a host. When viewed from the PC side, the DSC can be handled like a simple external storage device.

Upon building a direct print system by directly connecting a DSC to a printer using such USB, it is desired to use the DSC not only as a simple storage device but also as a user interface device as the system unlike the DSC for the PC.

Therefore, a printer must determine whether or not a connected device is a digital camera having such function. In other words, a printer must notify a digital camera that the connected printer has a direct print function.

However, since recent digital cameras have a USB interface, a digital camera can be physically connected to a printer. However, if a digital camera does not have the direct print function, uninterpretable information is sent to the digital camera, which cannot determine whether that information can be ignored or must be saved. If such information is saved for security, unnecessary data may remain stored.

When a DSC is directly connected to a printer, they exchange various kinds of information. In general, such two-way information exchange is achieved using commands. However, a plurality of pieces of information are often required to execute a given process.

Therefore, upon notifying one significant process or information, many commands must be exchanged, and the throughput as a whole inevitably deteriorates.

Especially, in an early stage of connection between the DSC and printer, the printer must notify the DSC of printer functions (manufacturer name, recordable paper sizes, layouts, availability of borderless print, and the like). In order to notify each of these functions using commands, commands corresponding to all kinds of functions must be defined in advance, and the number of times of exchange becomes huge. Even if commands are defined, they cannot cope with those for new functions, which may be added in the future.

Upon building a photo direct print system which directly connects a digital camera and printer, and prints images while reflecting the user's will, the present inventors tackled these problems as objects, and solved these problems.

DISCLOSURE OF INVENTION

The present invention has been made in consideration of the above problems, and has as its first object to provide a print apparatus, which can execute an authentication procedure that avoids unnecessary information from being stored in a digital camera irrespective of whether or not a digital camera connected to the printer has a direct print function, a control method thereof, and a print system.

It is the second object of the present invention to provide a print apparatus, which can improve information transfer efficiency upon building a photo direct print system and prints an image that the user wants to print in a short response time, a control method thereof, and a print system.

In order to achieve the above objects, for example, a print apparatus according to the present invention comprises the following arrangement.

That is, a printer apparatus which directly connects a digital camera via versatile communication means, uses the digital camera as a user interface device, and prints a sensed image stored and held by the digital camera, comprises:

request means for requesting a connected external device to send information possessed by the external device so as to authenticate if the external device is a digital camera having a direct print function, in an early stage of connection with the external device via the communication means; and notification means for, when information sent from the connected device describes authentication information possessed by a camera having a direct print function as a result of the request by the request means, determining that the device is the digital camera having the direct print function, and sending authentication information indicating that the printer apparatus itself as a connection source has the direct print function.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 7 is a view for explaining an outline of NCDP communication procedures according to the embodiment of the present invention;

FIG. 8 is a view for explaining commands in NCDP according to the embodiment of the present invention;

FIG. 11 is a chart for explaining a print sequence upon occurrence of an error in "recommended procedure" in NCDP according to the embodiment of the present invention;

FIG. 12 is a view for explaining an example of Capability transmitted in NCDP according to the embodiment of the present invention;

BEST MODE FOR CARRYING OUT THE INVENTION

An embodiment according to the present invention will be described hereinafter with reference to the accompanying drawings.

Figure 1:
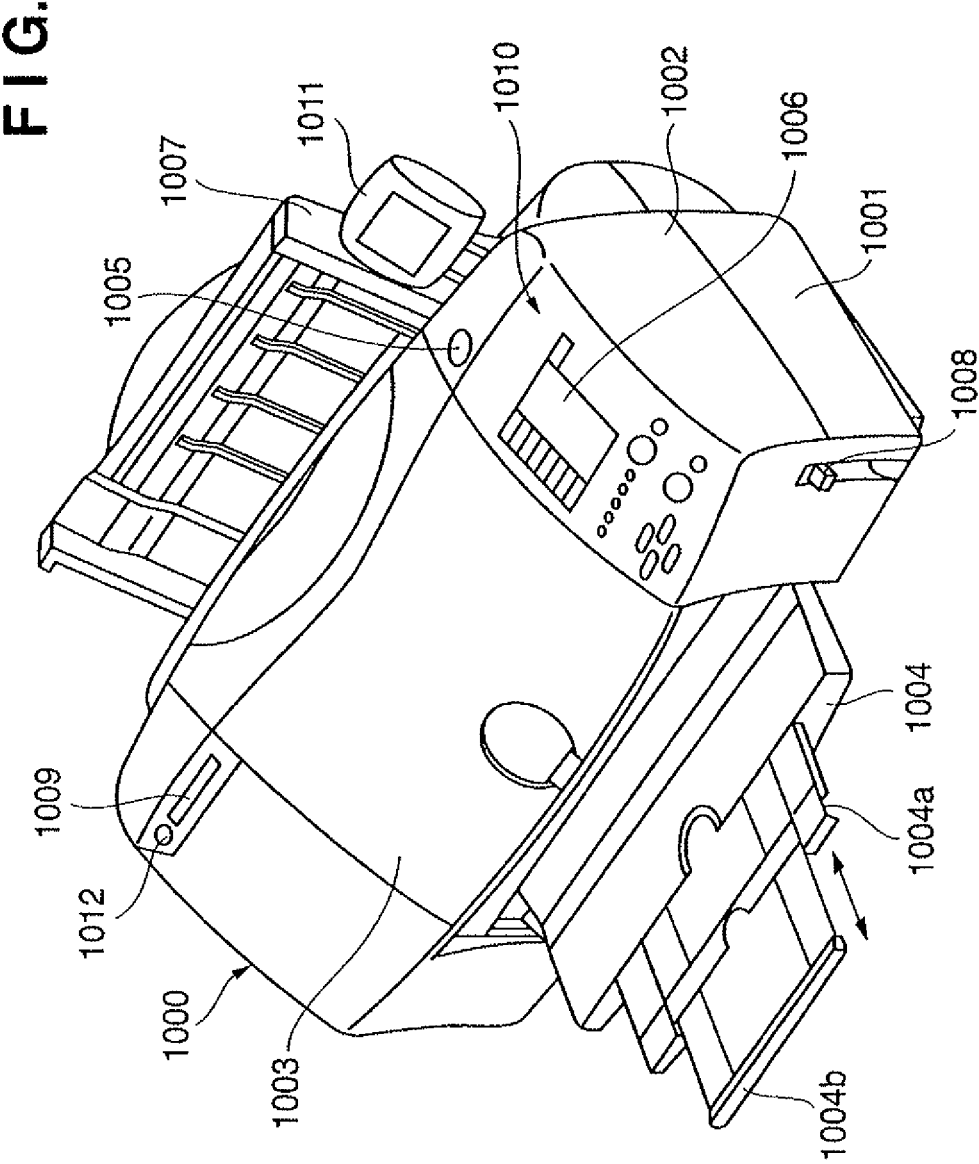
FIG. 1 is a schematic perspective view of a PD printer apparatus according to an embodiment of the present invention.

FIG. 1 is a schematic perspective view of a photo direct printer apparatus (to be referred to as a PD printer apparatus hereinafter) 1000 according to an embodiment of the present invention. This PD printer apparatus 1000 has a function of printing data received from a host computer (PC) as a normal PC printer, and a function of printing image data directly read from a storage medium such as a memory card or the like or printing image data received from a digital camera.

Referring to FIG. 1, a main body which forms a housing of the PD printer apparatus 1000 according to this embodiment has a lower case 1001, upper case 1002, access cover 1003, and exhaust tray 1004 as an exterior member. The lower case 1001 nearly forms the lower half portion of the main body, and the upper case 1002 nearly forms the upper half portion of the main body. By combining these cases, a hollow structure which has a storage space that stores a mechanism to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. For this reason, upon making the printer apparatus 1000 execute a print process, the exhaust tray 1004 is rotated toward the front surface side to open the opening, so that print sheets can be exhausted from the opening. The exhausted print sheets are stacked on the exhaust trays 1004 in turn. The exhaust tray 1004 stores two auxiliary trays 1004a and 1004b, and when these auxiliary trays are pulled out as needed, the loading area of print sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of that lever using a microswitch or the like, the open/close state of the access cover 1003 is detected.

A power key 1005 is arranged on the upper surface of the upper case 1003 so as to be able to be pressed. A control panel 1010 which comprises a liquid crystal display 1006, various key switches, and the like is provided on the right side of the upper case 1002. The structure of the control panel 1010 will be described in detail later with reference to FIG. 2. Reference numeral 1007 denotes an automatic feeder which automatically conveys a print sheet into the apparatus main body. Reference numeral 1008 denotes a paper gap select lever which is used to adjust the gap between the printhead and print sheet. Reference numeral 1009 denotes a card slot which receives an adapter that can receive a memory card. Via this adapter, image data stored in the memory card can be directly fetched and printed. As this memory card (PC), for example, a compact flash card, smart media card, memory stick, and the like are available. Reference numeral 1011 denotes a viewer (liquid crystal display unit) which is detachable from the main body of this PD printer apparatus 1000, and is used to display an image for one frame, index image, and the like. Reference numeral 1012 denotes a USB terminal used to connect a digital camera (to be described later). Also, another USB connector used to connect a personal computer (PC) is provided on the rear surface of this PD printer apparatus 1000.

Figure 2:
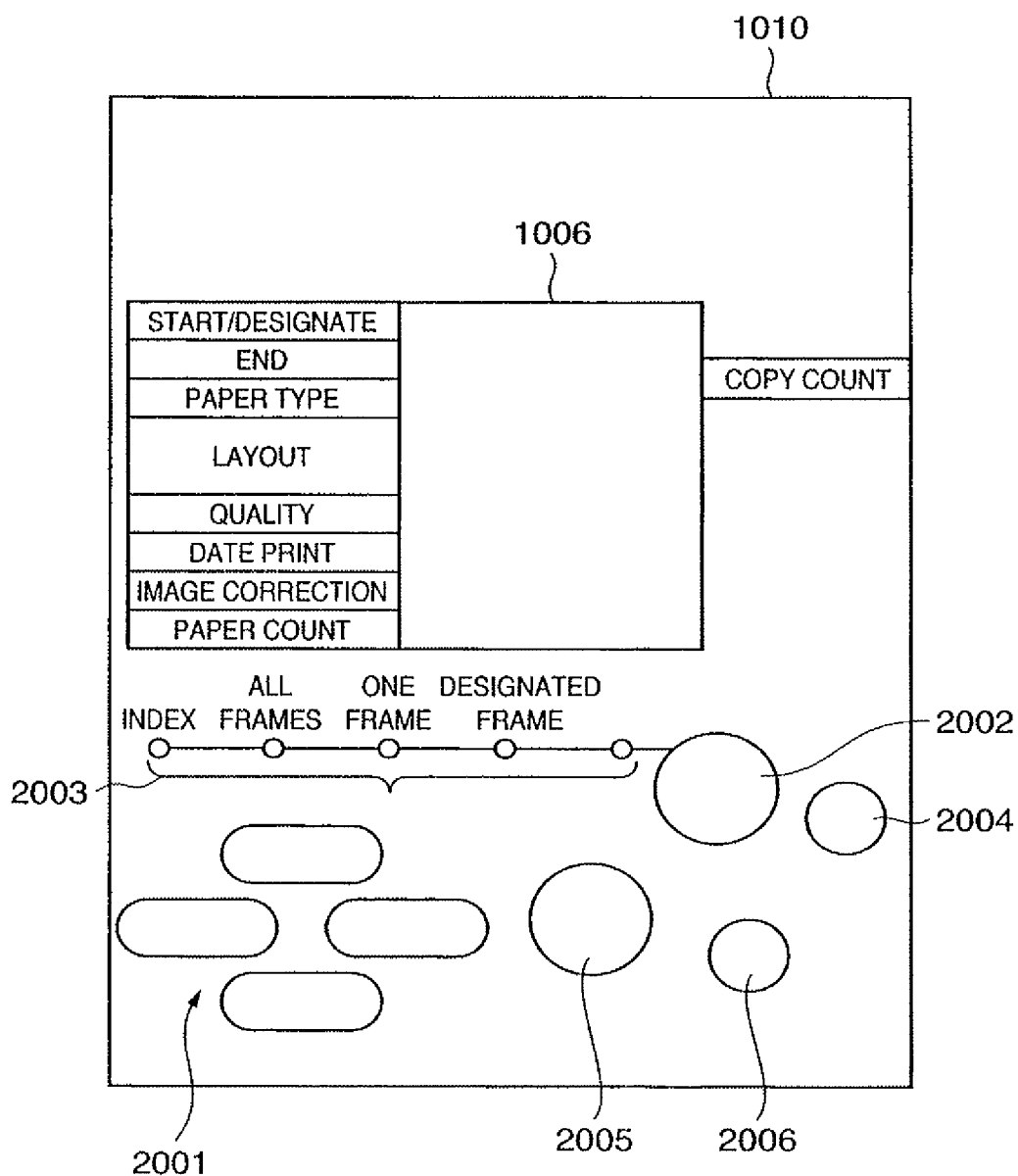
FIG. 2 is a schematic view of a control panel of the PD printer apparatus according to the embodiment of the present invention.

FIG. 2 is a schematic view of the control panel 1010 of the PD printer apparatus 1000 according to this embodiment.

Referring to FIG. 2, a liquid crystal display unit 1006 displays menu items used to set data associated with item names printed on the right and left sides of the unit 1006. The items displayed on this unit include, e.g., the first photo number or designated frame number of the range to be printed (start frame designation/print frame designation), the last photo number of the range to be printed (end), the number of copies to be printed (copy count), the type of paper sheet (print sheet) used in a print process (paper type), the setup of the number of photos to be printed per print sheet (layout), designation of print quality (quality), designation as to whether or not to print a photographing date (date print), designation as to whether or not to print a photo after correction (image correction), display of the number of print sheets required for the print process (print sheet count), and the like. These items are selected or designated using cursor keys 2001. Reference numeral 2002 denotes a mode key. Every time this key is pressed, the type of print (index print, all-frame print, one-frame print, and the like) can be switched, and a corresponding one of LEDs 2003 is turned on in accordance with the selected type of print. Reference numeral 2004 denotes a maintenance key which is used to do maintenance of the printer (e.g., cleaning of the printhead, and the like). Reference numeral 2005 denotes a print start key which is pressed when the start of a print process is instructed or when the maintenance setup is settled. Reference numeral 2006 denotes a print cancel key which is pressed when a print process or maintenance is canceled.

The arrangement of principal part associated with the control of the PD printer apparatus 1000 of this embodiment will be described below with reference to FIG. 3. Note that the same reference numerals in FIG. 3 denote parts common to those in the above drawings, and a description thereof will be omitted.

Figure 3:
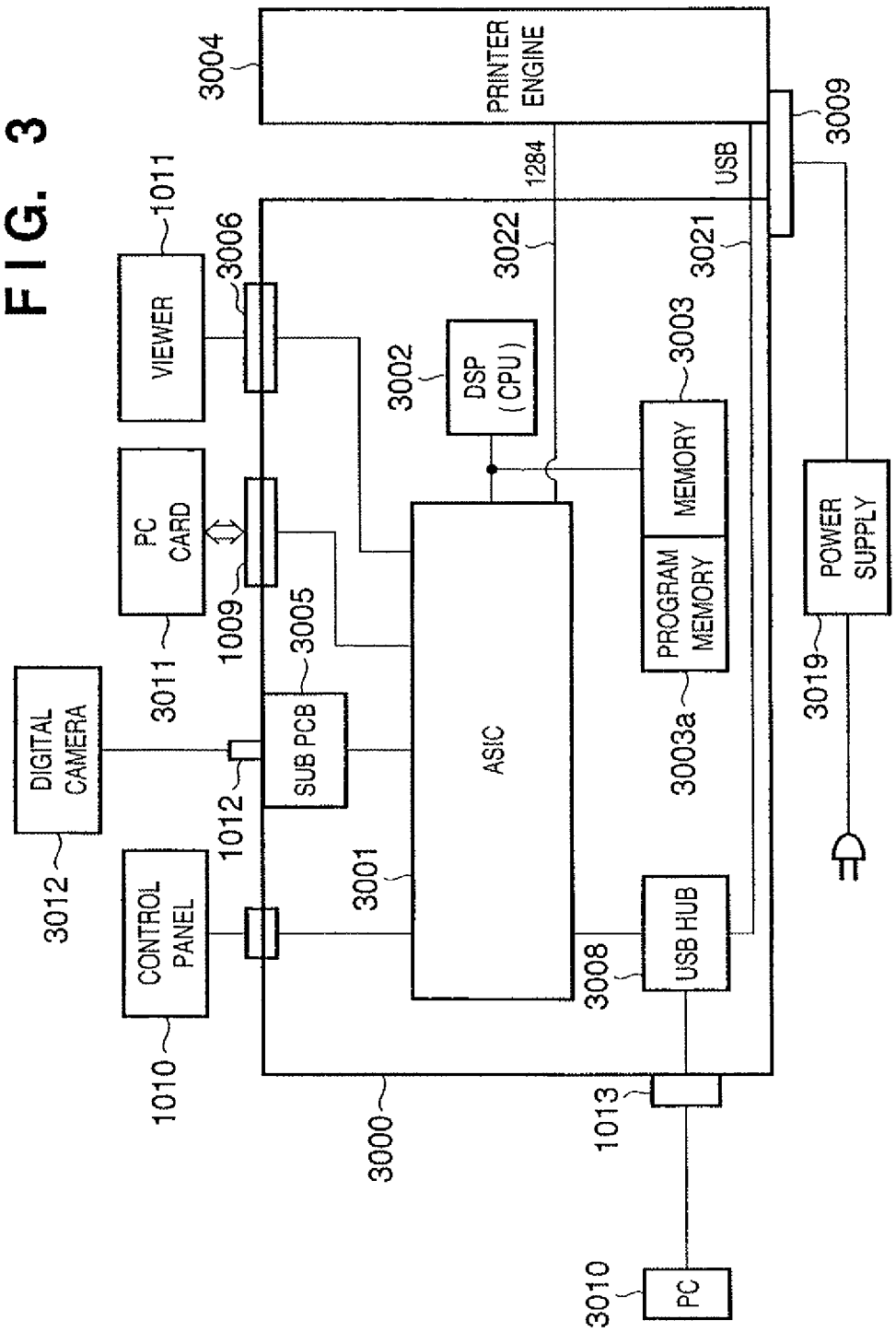
FIG. 3 is a block diagram showing the arrangement of principal part associated with control of the PD printer apparatus according to the embodiment of the present invention.

Referring to FIG. 3, reference numeral 3000 denotes a controller (control board). Reference numeral 3001 denotes an ASIC (dedicated custom LSI). The arrangement of the ASIC 3001 will be described later with reference to the block diagram of FIG. 4. Reference numeral 3002 denotes a DSP (digital signal processor), which includes a CPU and executes various kinds of control to be described later, and image processes such as conversion from a luminance signal (RGB) into a density signal (CMYK), scaling, gamma conversion, error diffusion, and the like. Reference numeral 3003 denotes a memory, which has a memory area that serves as a program memory 3003a for storing a control program to be executed by the CPU of the DSP 3002, a RAM area for storing a running program, and a work area for storing image data and the like. Reference numeral 3004 denotes a printer engine. In this embodiment, the printer is equipped with a printer engine of an ink-jet printer which prints a color image using a plurality of color inks. Reference numeral 3005 denotes a USB connector as a port for connecting a digital camera (DSC) 3012. Reference numeral 3006 denotes a connector for connecting the viewer 1011. Reference numeral 3008 denotes a USB hub (USB HUB). When the PD printer apparatus 1000 executes a print process based on image data from a PC 3010, the USB hub 3008 allows data received from the PC 3010 to pass through it, and outputs the data to the printer engine 3004 via a USB 3021. In this way, the PC 3010 connected to the printer apparatus can execute a print process by directly exchanging data, signals, and the like with the printer engine 3004 (the printer apparatus serves as a normal PC printer). Reference numeral 3009 denotes a power supply connector, which inputs a DC voltage which is converted from commercial AC power by a power supply 3019. The PC 3010 is a general personal computer. Reference numeral 3011 denotes a memory card (PC card) mentioned above; and 3012, a digital camera (DSC: Digital Still Camera).

Note that signals are exchanged between this controller 3000 and printer engine 3004 via the USB 3021 or an IEEE1284 bus 3022.

Figure 4:
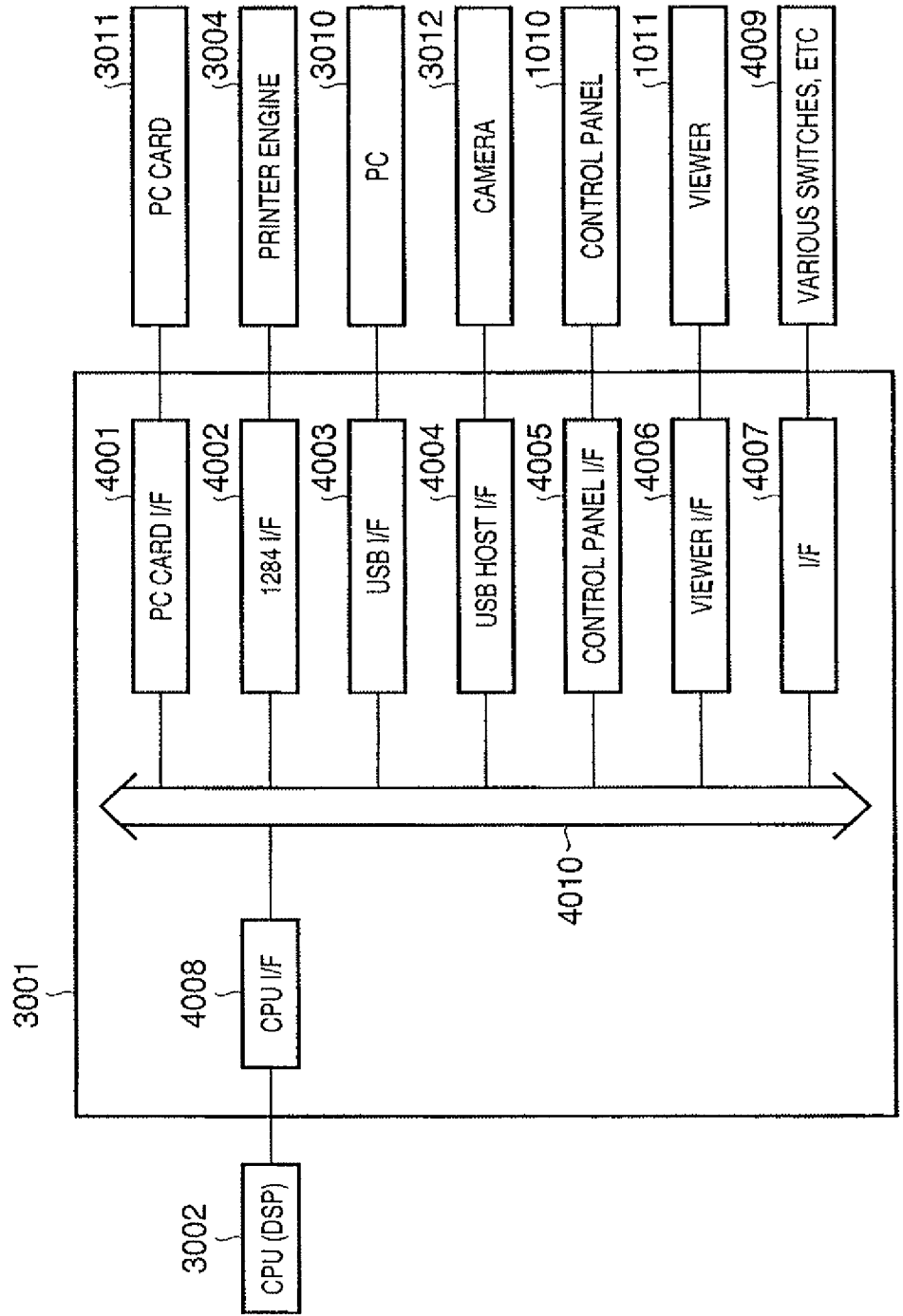
FIG. 4 is a block diagram showing the arrangement of an ASIC of the PD printer apparatus according to the embodiment of the present invention.

FIG. 4 is a block diagram showing the arrangement of the ASIC 3001. In FIG. 4 as well, the same reference numerals denote parts common to those in the above drawings, and a description thereof will be omitted.

Reference numeral 4001 denotes a PC card interface, which is used to read image data stored in the inserted memory card 3011, and to write data in the memory card 3011. Reference numeral 4002 denotes an IEEE1284 interface, which is used to exchange data with the printer engine 3004. This IEEE1284 interface 4002 is a bus used when image data stored in the digital camera 3012 or PC card 3011 is to be printed. Reference numeral 4003 denotes a USB interface, which exchanges data with the PC 3010. Reference numeral 4004 denotes a USB host interface, which exchanges data with the digital camera 3012. Reference numeral 4005 denotes a control panel interface, which receives various operation signals from the control panel 1010, and outputs display data to the display unit 1006. Reference numeral 4006 denotes a viewer interface, which controls display of image data on the viewer 1011. Reference numeral 4007 denotes an interface, which controls interfaces with various switches, LEDs 4009, and the like. Reference numeral 4008 denotes a CPU interface, which exchanges data with the DSP 3002. Reference numeral 4010 denotes an internal bus (ASIC bus), which interconnects these interfaces.

Figure 26:
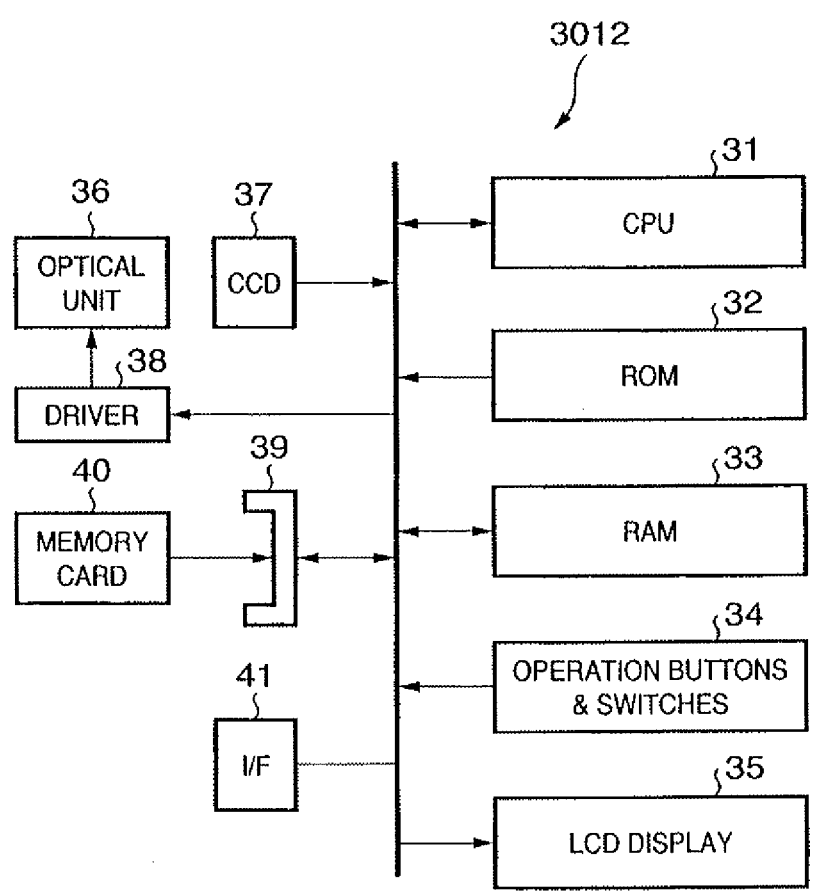
FIG. 26 is a block diagram of a digital camera DSC in the embodiment.

FIG. 26 is a block diagram of the DSC 3012 in this embodiment. The components of the DSC 3012 will be briefly described (firmware is compatible to NCDP).

Referring to FIG. 26, reference numeral 31 denotes a CPU which controls the overall DSC; and 32, a ROM that stores the processing sequence (firmware) of the CPU 31 (note that the ROM comprises a rewritable nonvolatile memory (e.g., a flash memory) since the firmware version is updated as needed). Reference numeral 33 denotes a RAM which is used as a work area of the CPU 31; and 34, a switch group used to make various operations. Reference numeral 35 denotes a liquid crystal display, which is used to confirm a sensed image, and to display a menu upon making various setups. In this embodiment, these components 34 and 35 serve as a user interface of the whole system when the DSC serves as a member of the direct print system. Reference numeral 36 denotes an optical unit which mainly comprises a lens and its drive system. Reference numeral 37 denotes a CCD element; and 38, a driver which controls the optical unit 36 under the control of the CPU 31. Reference numeral 39 denotes a connector that receives a storage medium 40 (compact flash memory card, smart media card, or the like); and 41, a USB interface (the slave side of the USB) used to connect the PC or PD printer 1000 of this embodiment.

The arrangements of the PD printer and DSC of this embodiment have been explained. An outline of the operation based on the above arrangement will be explained below.

<Normal PC Printer Mode>

This mode is a print mode for printing an image on the basis of print data sent from the PC 3010.

In this mode, when data from the PC 3010 is input via the USB connector 1013 (FIG. 3), it is directly sent to the printer engine 3004 via the USB hub 3008 and USB 3021, and a print process is executed based on the data from the PC 3010.

<Direct Print Mode from PC Card>

When the PC card 3011 is attached to or detached from the card slot 1009, an interrupt is generated, and the DSP 3002 can detect based on this interrupt whether or not the PC card 3011 is attached or detached (removed). When the PC card 3011 is attached, compressed image data (e.g., compressed by JPEG) stored in that PC card 3011 is read and stored in the memory 3003. After that, the compressed image data is decompressed, and is stored in the memory 3003 again. When the user has issued a print instruction of that stored data, the image data is converted into print data that can be printed by the printer engine 3004 by executing conversion from RGB signals into YMCK signals, gamma correction, error diffusion, and the like, and the print data is output to the printer engine 3004 via the IEEE1284 interface 4002, thus printing an image.

<Direct Print Mode from Camera>

Figure 5:
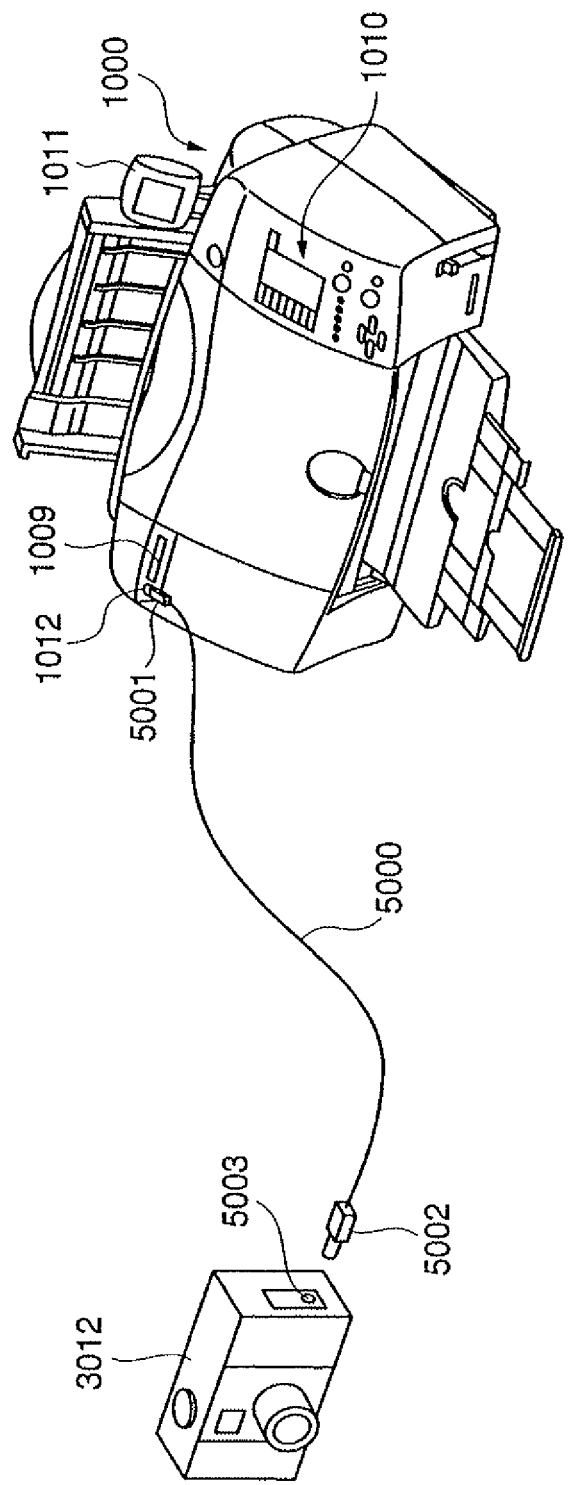
FIG. 5 is a view showing the connection state of the PD printer apparatus according to the embodiment of the present invention, and a digital camera.

FIG. 5 shows the connection state of the PD printer apparatus 1000 and digital camera 3012 according to this embodiment.

Referring to FIG. 5, a cable 5000 comprises a connector 5001 which is connected to the connector 1012 of the PD printer apparatus 1000, and a connector 5002 which is connected to a connector 5003 of the digital camera 3012. The digital camera 3012 can output image data saved in its internal memory via the connector 5003. Note that the digital camera 3012 can adopt various arrangements, e.g., an arrangement that comprises an internal memory as storage means, an arrangement that comprises a slot for receiving a detachable memory card, and so forth. When the PD printer apparatus 1000 and digital camera 3012 are connected via the cable 5000 shown in FIG. 5, image data output from the digital camera 3012 can be directly printed by the PD printer apparatus 1000.

When the digital camera 3012 is connected to the PD printer apparatus 1000, as shown in FIG. 5, and the control enters a direct print mode as a result of negotiation, a camera mark alone is displayed on the display unit 1006 on the control panel 1010, display and operations on the control panel 1010 are disabled, and display on the viewer 1011 is also disabled. Therefore, since only key operations at the digital camera 3012 and image display on a display unit (not shown) of the digital camera 3012 are enabled, the user can designate print setups using that digital camera 3012. Also, any errors which may be caused upon operations of the digital camera 3012 and the control panel of the printer at the same time can be prevented.

This embodiment has as its object to provide a PD printer apparatus which can connect digital cameras of a plurality of manufacturers and can print their data, and protocols upon executing a print process when the PD printer apparatus 1000 according to this embodiment and a digital camera are connected will be described in detail hereinafter.

This embodiment proposes NCDP (New Camera Direct Print) which makes communication control between the PD printer apparatus and digital camera using a versatile file and versatile format, and is independent from interfaces.

Figure 6:
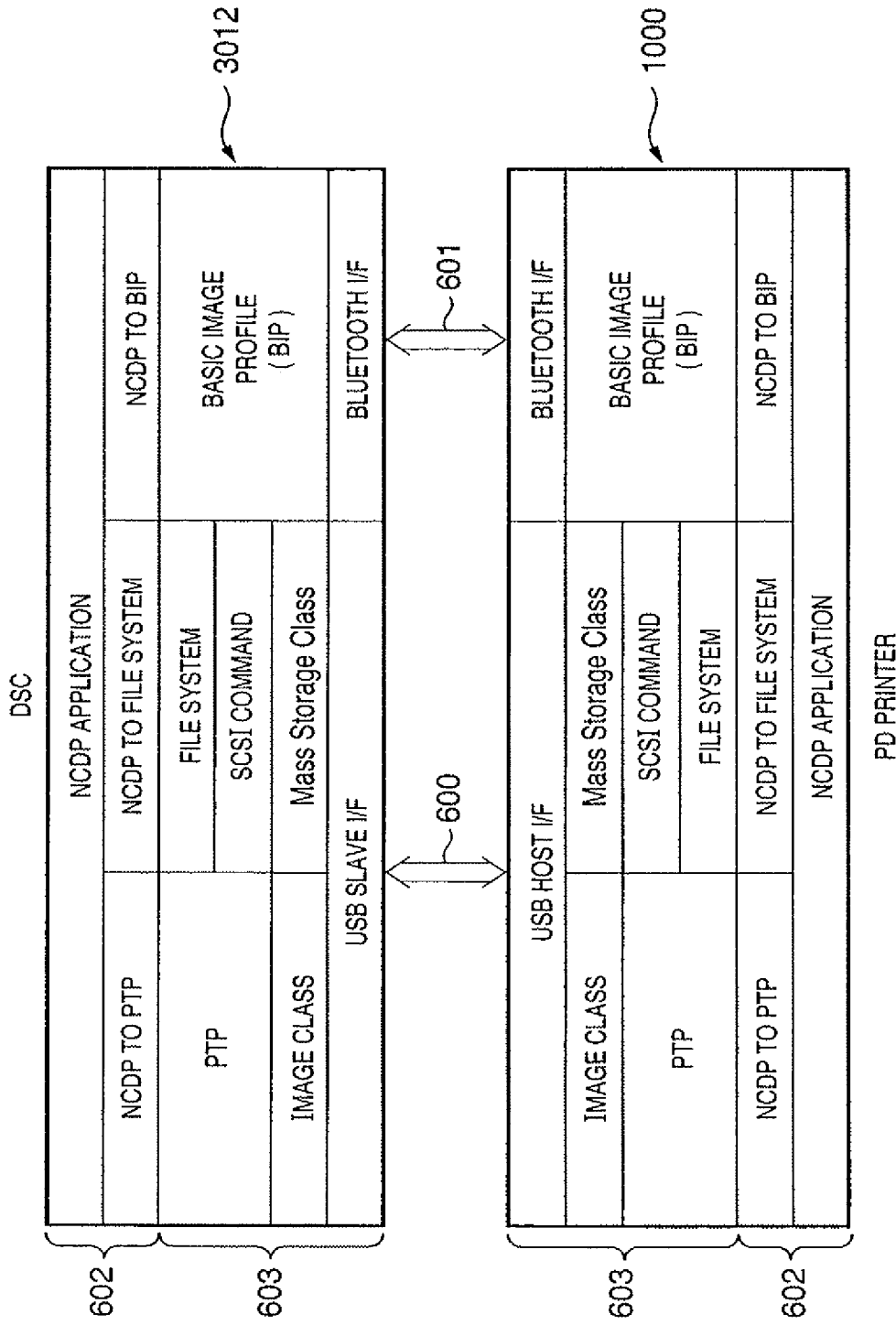
FIG. 6 is a view for explaining the software configurations of a PD printer apparatus and digital camera, which incorporate NCDP according to the embodiment of the present invention.

FIG. 6 shows an example of the configuration of this NCDP.

Referring to FIG. 6, reference numeral 600 denotes a USB interface; and 601, a Bluetooth interface. Reference numeral 602 denotes an application layer which is built in upon forming a system based on NCDP. Reference numeral 603 denotes a layer that implements existing protocols and interfaces. In FIG. 6, PTP (Picture Transfer Protocol), SCSI, BIP (Basic Image Profile) of Bluetooth, and the like are installed. The NCDP according to this embodiment is premised on installation as an application on the architecture of the above protocol layer. In this case, the PD printer apparatus 1000 is specified as a USB host, the camera 3012 is specified as a USB device, and they have the same NCDP configurations, as shown in FIG. 6.

As will be described in detail later, a merit of use of the NCDP of this embodiment lies in that when the PD printer apparatus 1000 and DSC 3012 exchange information with each other at the time of and after making transition to NCDP, a file (text file) which describes a series of pieces of information and a series of operation procedures as a script is generated, that file is sent to a partner device, and the receiving side interprets the received script to execute processes. As a result, when arbitrary information is to be sent to the partner side, if that information consists of a plurality of elements, individual elements need not be exchanged by handshake, and the overhead upon information transfer can be reduced, thus improving the information transfer efficiency. For example, assume that there are a plurality of images to be printed on the DSC 3012 side. In such case, if the user selects images to be printed as much as he or she wants, and sets print conditions for these images, a series of print procedures are described as a script, and that script can be sent to the PD printer apparatus 1000. The PD printer apparatus 1000 side can detect the print conditions of a plurality of images at once by interpreting the received script, and can execute their print processes according to the script.

FIG. 7 is a view for explaining the flow of communication procedures between the PD printer apparatus 1000 and digital camera (DSC) 3012 on the basis of the NCDP according to this embodiment.

In this case, when it is detected that the PD printer apparatus 1000 and DSC 3012 are connected via the USB cable 5000, as shown in FIG. 5, a communication between these devices is allowed. As a result, applications installed in these devices are executed to start transition to procedures 701 based on the NCDP. Reference numeral 702 denotes an initial state of the NCDP. In this state, it is determined whether or not each others models can implement the NCDP. If the NCDP can be implemented, the devices make transition to the procedures 701. If the DSC 3012 does not install any NCDP, no communication control based on the NCDP is executed. After transition to the NCDP is made in this way, when the DSC 3012 issues a transfer/print instruction of image data based on "basic procedure", as indicated by 703, the control shifts to a simple print mode in which an image file is transferred from the DSC 3012 to the PD printer apparatus 1000, and is printed. On the other hand, when the DSC 3012 issues a transfer/print instruction of image data based on "recommended procedure", as indicated by 704, the control shifts to a print mode corresponding to diversified functions, in which the DSC 3012 and PD printer apparatus 1000 make various negotiations to determine the print condition and the like, an image file is transferred from the DSC 3012 to the PD printer apparatus 1000 and printed in accordance with the print condition. Furthermore, when the DSC 3012 issues a transfer/print instruction of image data based on "extended procedure", as indicated by 705, a mode that executes a print process using an advanced layout function such as DPOF, XHTML-print, SVG, or the like and specifications unique to each vendor is set. Note that the detailed specifications based on this "extended procedure" are specified in the specifications of each individual DSC manufacturer, and a description thereof will be omitted. Note that the image print processes based on these "basic procedure" and "recommended procedure" will be described later with reference to FIGS. 9 to 11.

FIG. 8 is a view for explaining commands specified to print in the NCDP according to this embodiment.

Referring to FIG. 8, "corresponding mode" corresponds to the above "basic procedure", "recommended procedure", and "extended procedure" designated by the DSC 3012. In "recommended procedure", all commands can be used. However, since "basic procedure" is a simple print mode, only NCDP start and end commands, a shift command to each of "basic procedure", "recommended procedure", and "extended procedure" modes, an acquisition command of image data from the camera 3012, and a print command from the camera 3012 can be used. In "extended procedure", only NCDP start and end commands, and a shift command to each of "basic procedure", "recommended procedure", and "extended procedure" modes are allowed to be used in FIG. 8. However, as described above, other commands may be used in accordance with the specifications of respective manufacturers.

The image print processes based on the above "basic procedure" and "extended procedure" will be explained below.

Figure 9:
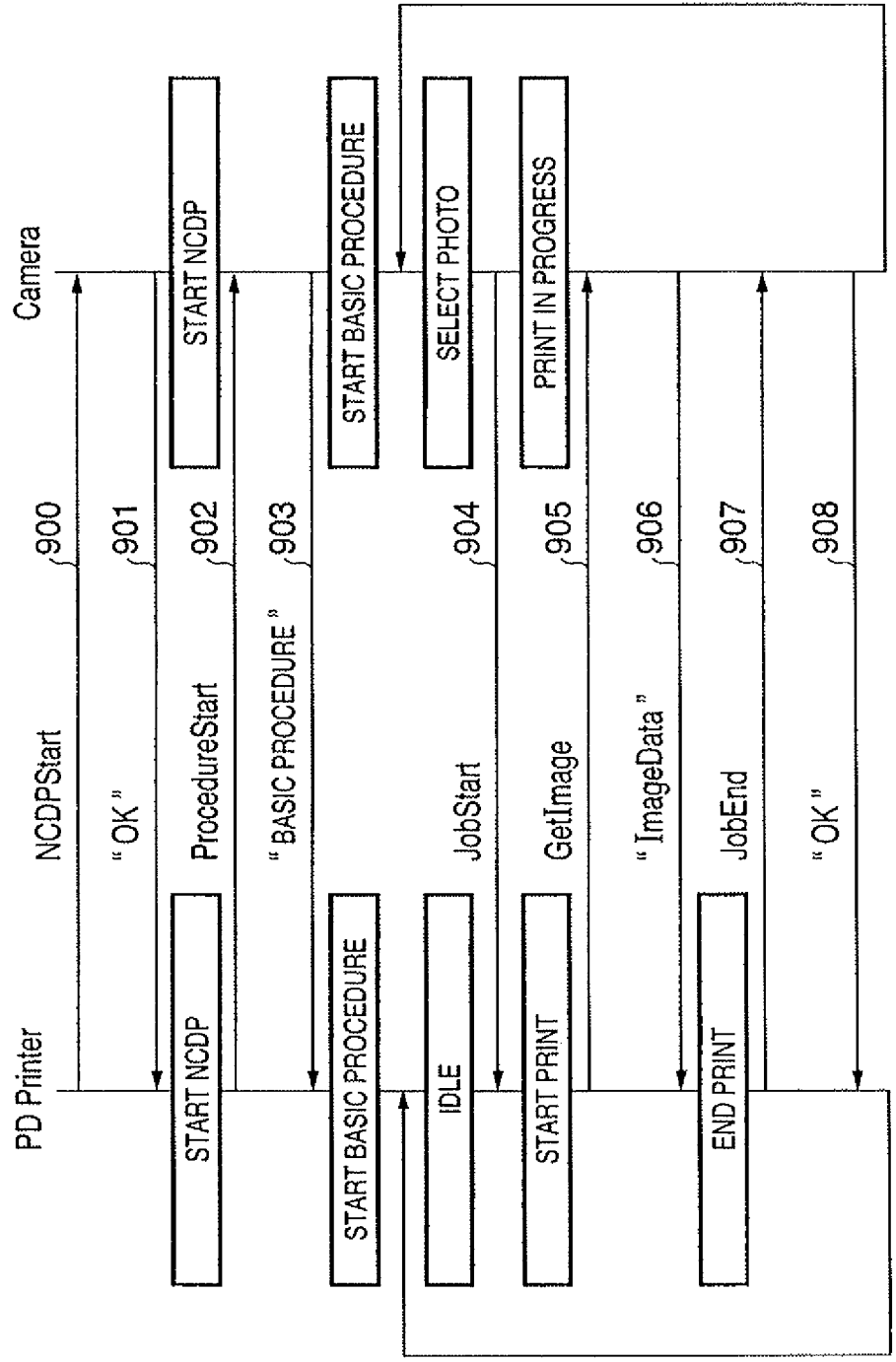
FIG. 9 is a chart for explaining a print sequence based on "basic procedure" in NCDP according to the embodiment of the present invention.

FIG. 9 is a chart for explaining the NCDP communication procedures when an image print process is executed based on "basic procedure". This "basic procedure" is a simple print mode in which one image file is transferred from the DSC to the PD printer apparatus 1000 and is printed. Compatible image formats include an RGB image of the VGA size (640×480 pixels) and a JPEG image of the VGA size (640×480 pixels). The DSC 3012 transmits an image file in an image format supported by the PD printer apparatus 1000. In this case, no error handling is executed. The print process of this mode is limited to the layout of one image per sheet. This simple mode is plain for the user.

The PD printer apparatus 1000 sends a command (NCDP-Start) indicating transition to NCDP to the DSC 3012 (900). If the DSC 3012 installs NCDP, it replies "OK" (901). Note that a practical example of this NCDP confirmation procedure using PTP will be explained in detail later with reference to FIG. 14.

If it is confirmed each other that the NCDP is installed, the PD printer apparatus 1000 transmits a mode shift command (ProcedureStart) to the DSC 3012 (902). In response to this command, when the DSC 3012 transmits "basic procedure" as a simple print mode (903), the control shifts to a print mode based on "basic procedure". In this case, when an image to be printed is selected and its print instruction is issued upon operation on the DSC 3012, a command (JobStart) indicating the start of a print job is sent from the DSC 3012 to the PD printer apparatus 1000 (904). In response to this command, the PD printer apparatus 1000 is set in the simple print mode, and sends a command (GetImage) to the DSC 3012 to request it to send a JPEG image (905). Then, the DSC 3012 sends a JPEG image to the PD printer apparatus 1000 (906), and a print process in the PD printer apparatus 1000 starts. Upon completion of the print process of the designated image, the PD printer apparatus 1000 sends a command (JobEnd) indicating the end of the print job to the DSC 3012 (907). When the DSC 3012 returns an affirmative response (OK) in response to this command (908), the print process based on this "basic procedure" ends.

Since mode designation from the camera allows the device at which a print operation is to be made to designate a mode, the user who operates the camera can easily designate a mode he or she wants.

Figure 10:
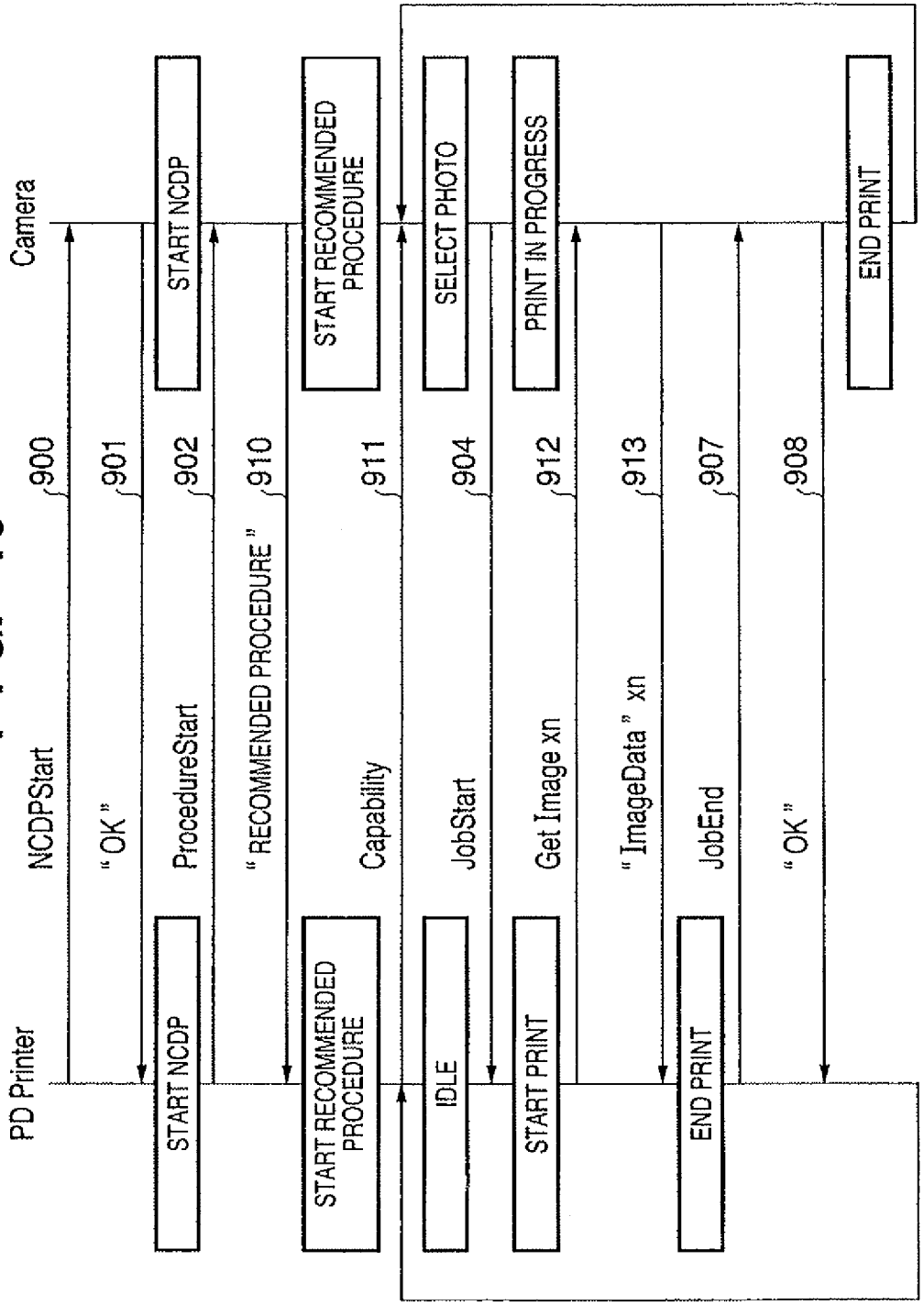
FIG. 10 is a chart for explaining a print sequence based on "recommended procedure" in NCDP according to the embodiment of the present invention.

FIG. 10 is a chart for explaining the NCDP communication procedures when an image print process is executed based on "recommended procedure". The same reference numerals in FIG. 10 denote procedures common to those in FIG. 9, and a description thereof will be omitted. In this "recommended procedure", a "more diversified print" mode premised on negotiation between the PD printer apparatus 1000 and DSC 3012 can be set, and photo print and layout print processes of a plurality of images can be made. Also, error handling can be executed.

In FIG. 10, after it is confirmed each other that the NCDP is installed as in FIG. 9, the DSC 3012 designates "recommended procedure" (910) in this case. After that, procedures based on this "recommended procedure" are executed. The PD printer apparatus 1000 generates its functions and those including paper setups and the like as Capability information, and informs the DSC 3012 of all of them (911). This Capability information is transmitted to the DSC 3012 in a script format (a file that describes a series of procedures and information in a text format).

FIG. 12 shows an example of this Capability information.

As shown in FIG. 12, this Capability information contains information of the printable paper types and sizes, print quality, image data format, ON/OFF of date print, ON/OFF of file name print, layout, ON/OFF of image correction, and ON/OFF of functions corresponding to the specification of each camera manufacturer and the like as options.

Since the Capability information adopts script notation, and this notation complies with XML, that information can be easily exported to the architecture of another communication protocol, and exchange of such function information can be easily standardized. This reason can be easily understood in comparison to, e.g., a case wherein individual elements are described using dedicated commands. For example, if the DSC 3012 is notified of a description "<ImageType= . . . >" used to notify the image types that the PD printer apparatus 1000 can process in FIG. 12, a dedicated command is required. It is impossible from the start to prepare commands in consideration of new functions which may be added in the future. Since functions are described using a script, a series of pieces of information can be described as text of a plurality of lines. If the script contains an element that cannot be interpreted, such element can be ignored. Hence, expansibility will never be disaffirmed. The same applies to other scripts.

Upon reception of such Capability information, the DSC 3012 can determine the functions of the PD printer apparatus 1000 to be used in a print process. The DSC 3012 presents a menu according to this determination result to the user to prompt him or her to select an image to be printed. In addition, the DSC 3012 selects and determines a print condition of that image from functions (print conditions) of the PD printer apparatus 1000. After the image to be printed and its print condition are determined, when a print start instruction is issued, a print command (JobStart) is sent to the PD printer apparatus 1000. In response to this command, the PD printer apparatus 1000 issues a command (GetImage xn) which requests that image data (912). In response to this command, the DSC 3012 transmits corresponding image data in an image format (Tiff, JPEG, RGB, or the like) that the PD printer apparatus 1000 can receive (913). The reason why a plurality of image data can be transmitted per image to be printed is that when, for example, 2×2 layout print or the like is designated, four image data must be transmitted per paper sheet. Upon completion of the print process of the designated image, the PD printer apparatus 1000 transmits a command (JobEnd) indicating the end of the print job to the DSC 3012 (907). When the DSC 3012 returns an affirmative response (OK) in response to this command (908), the control starts the select and print processes of the next image based on this "recommended procedure" again.

FIG. 11 is a chart for explaining the communication procedures when an error has occurred in the PD printer apparatus 1000 in the NCDP communication procedures upon executing an image print process based on the above "recommended procedure". The same reference numerals in FIG. 11 denote procedures common to those in FIG. 10, and a description thereof will be omitted.

FIG. 11 exemplifies a case wherein a paper feed error has occurred in the PD printer apparatus 1000 during the print process based on "recommended procedure". In this case, the PD printer apparatus 1000 sends status information (Status) indicating the paper feed error to the DSC 3012 (914). In response to this information, a command indicating if that print process is to be continued (JobContinue) or aborted (JobAbort) is transmitted to the PD printer apparatus 1000 on the basis of designation contents determined by the user of the DSC 3012 (915). When the print process is to be aborted, the PD printer apparatus 1000 aborts that print process, and transmits a print job end message (JobEnd). On the other hand, when continuation of the print process is designated, the apparatus continues the print process after that paper feed error is recovered.

The aforementioned processing sequence will be explained below with reference to the flow chart of FIG. 13.

Figure 13:
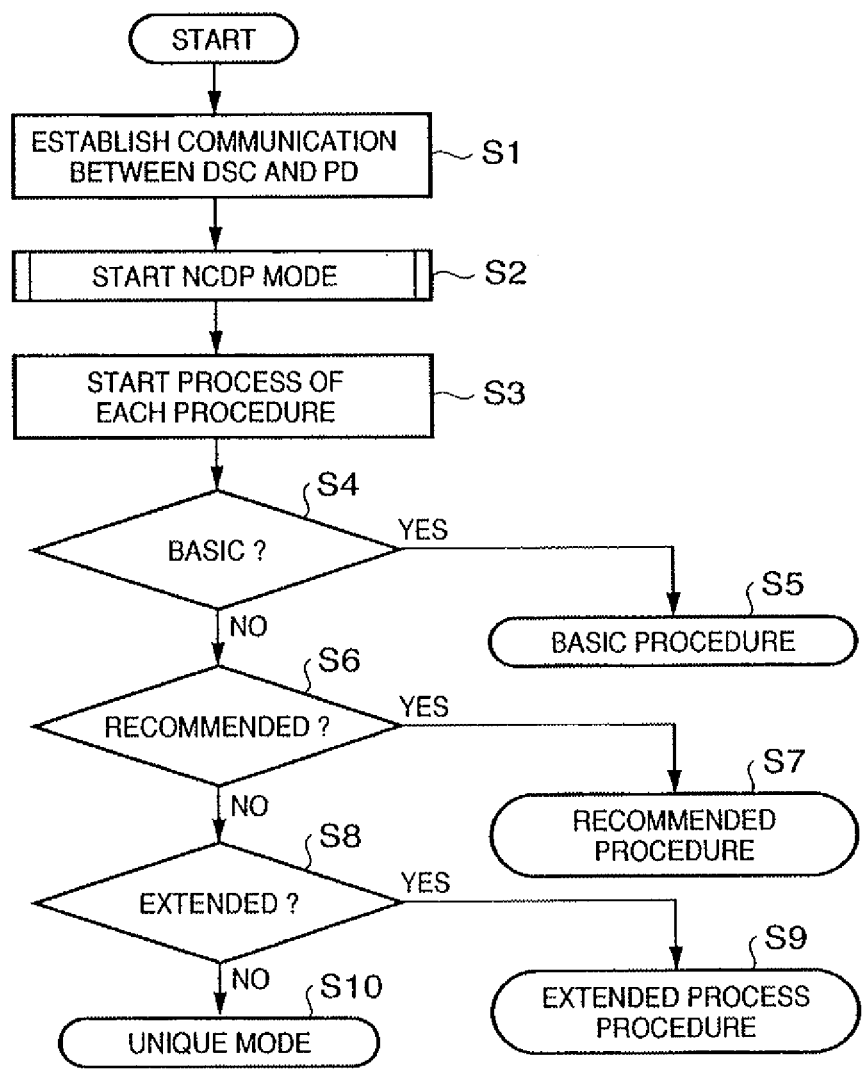
FIG. 13 is a flow chart for explaining an outline of the NCDP communication procedures according to the embodiment of the present invention.

FIG. 13 is a flow chart for explaining the processing sequence shown in FIG. 7.

In step S1, a communication is established between the digital camera (DSC) 3012 and PD printer apparatus 1000 (700). It is checked in step S2 if these devices have already installed NCDP. If these devices have already installed NCDP, the NCDP mode starts. The flow then advances to step S3 to receive a procedure instruction from the DSC 3012, and to start the designated procedure. If "basic procedure" is designated, the flow advances from step S4 to step S5 to execute a print process based on "basic procedure". On the other hand, if "recommended procedure" is designated, the flow advances from step S6 to step S7 to execute a print process based on "recommended procedure". Furthermore, if "extended procedure" is designated, the flow advances from step S8 to step S9 to execute a print process based on "extended procedure". If another procedure is designated, the flow advances to step S10 to execute a print process in a mode unique to the PD printer apparatus 1000 and DSC 3012.

An example wherein various commands (FIG. 8) in the NCDP mode mentioned above are implemented using the standard protocol PTP specified by PIMA (Photographic and Imaging Manufacturers Association) for image transfer (wrapper using PTP) will be described. In this embodiment, NCDP using PTP will be exemplified. However, the present invention is not limited to such specific example. For example, a direct print service API may be implemented on another interface or another class (Class).

[NCDPStart]

Figure 14:
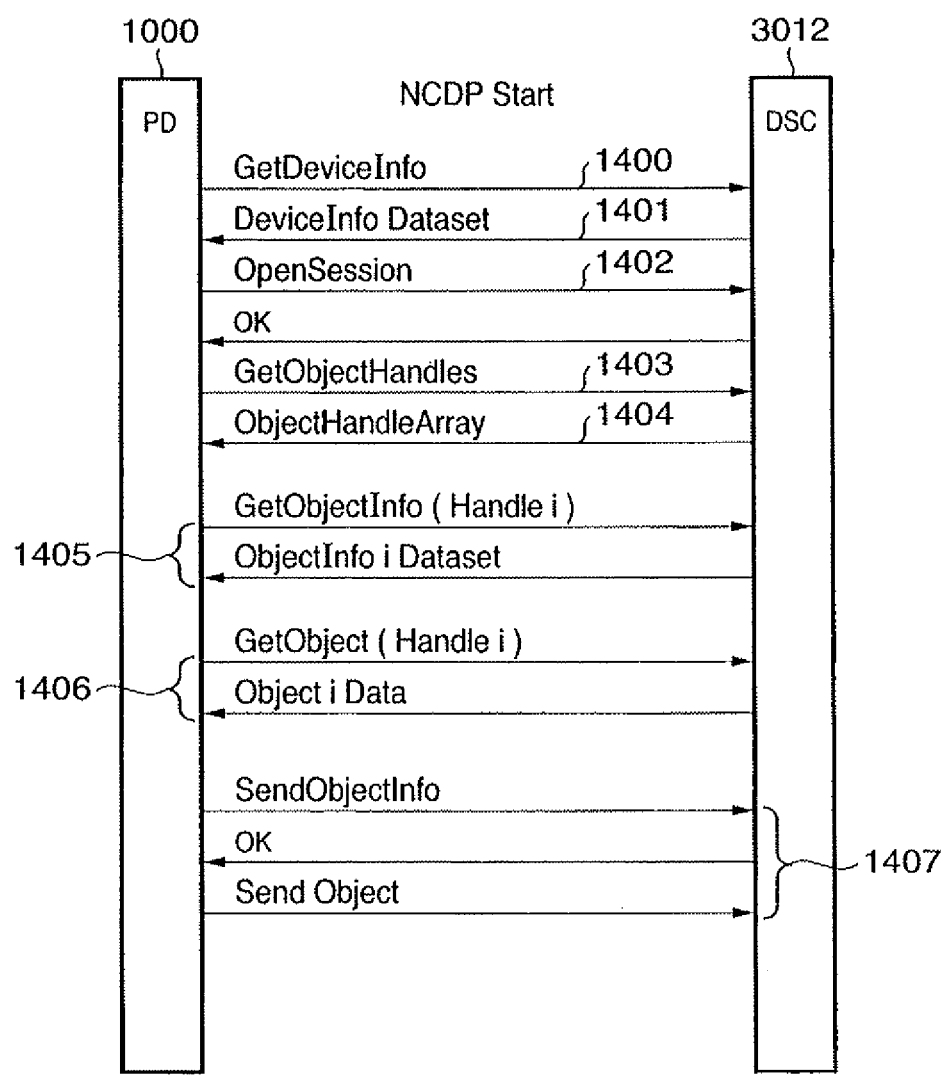
FIG. 14 is a view for explaining an example wherein a command (NCDPStart) that instructs to start the NCDP procedure is implemented using a PTP architecture.

FIG. 14 is a view for explaining an implementation example of a command (NCDPStart) that instructs to start the NCDP procedure using the standard image transfer protocol PTP. More specifically, FIG. 14 shows negotiation procedures of determining whether or not the DSC 3012 and PD printer apparatus can serve as the photo direct print system described in this embodiment, so as to dominate "shift to NCDP" in FIG. 7.

In procedure 1400, the PD printer apparatus 1000 transmits PTP command GetDeviceInfo to the DSC 3012 to request it to send information associated with objects held by the DSC. Simply stated, this command is an inquiry about what device is connected to the PD printer. In response to this command, the DSC 3012 transmits (informs) information about itself to the PD printer apparatus 1000 using DeviceInfo Dataset. However, this information is attribute information associated with a camera, which is specified by the PTP standard, but does not contain any information associated with direct print. In procedure 1402, PTP command OpenSession starts a session for assigning the DSC 3012 as a resource, assigning handles to data objects as needed, and making a special initialization process.

In procedure 1403, a handle request is sent to the DSC 3012. With this request, the PD printer apparatus 1000 requests numbers uniquely assigned to unknown objects (sensed images, scripts, and the like) held by the DSC so as to specify these objects. In response to this request, a handle list held by the DSC 3012 is sent back in procedure 1404 (this list is equivalent to a message indicating the number of objects).

As a result of the above procedures, the PD printer apparatus 1000 can determine the number of objects held by the DSC. It is important in negotiation to determine whether or not both devices have functions capable of starting NCDP. In this determination, when scripts which respectively describe passwords "NCDP_CAMERA" and "NCDP_PRINTER" are cast, and both devices can receive intended results from each other, the control starts the NCDP direct print mode.

Therefore, as described above, the PD printer 1000 side must search objects held by the DSC 3012 for an object whose attribute is a script.

For this purpose, the PD printer apparatus 1000 outputs PTP command GetObjectInfo(Handle i) (in this case, i=1) that inquires the attribute of an object with first handle "1" to the DSC 3012, and receives the returned i-th attribute (ObjectInfo i Dataset). The printer apparatus repeats this process from 1 to the maximum number of objects. More specifically, the printer apparatus searches for an object whose attribute is not an image but a script that describes a password (word). PTP command GetObjectInfo can designate an object type as an option. However, since some digital cameras may not support this option, such script object search process is required.

When the PD printer apparatus 1000 side detects a handle (let handle "j") of the script object, it outputs PTP command "GetObject(Handle j)" which requests data indicated by that handle "j" to the DSC 3012. As a result, the DSC 3012 outputs a script which describes password "NCDP_CAMERA" to the PD printer apparatus 1000 as "Object j Data".

As a result, the PD printer apparatus 1000 can recognize that the connected DSC 3012 is an NCDP compatible digital camera. Next, the PD printer apparatus 1000 sends password "NCDP_PRINTER" indicating an NCDP compatible printer. Prior to this password, the printer apparatus transmits attribute information of an object to be transmitted using SendObjectInfo (S1407). Then, the printer apparatus notifies the DSC 3012 of password "NCDP_PRINTER" using SendObject. Note that these passwords are merely examples, and the present invention is not limited to these specific ones.

As a result of the above procedures, both devices recognize that they are NCDP compatible devices. After that, the control enters the NCDP photo direct print mode according to this embodiment.

Figure 25:
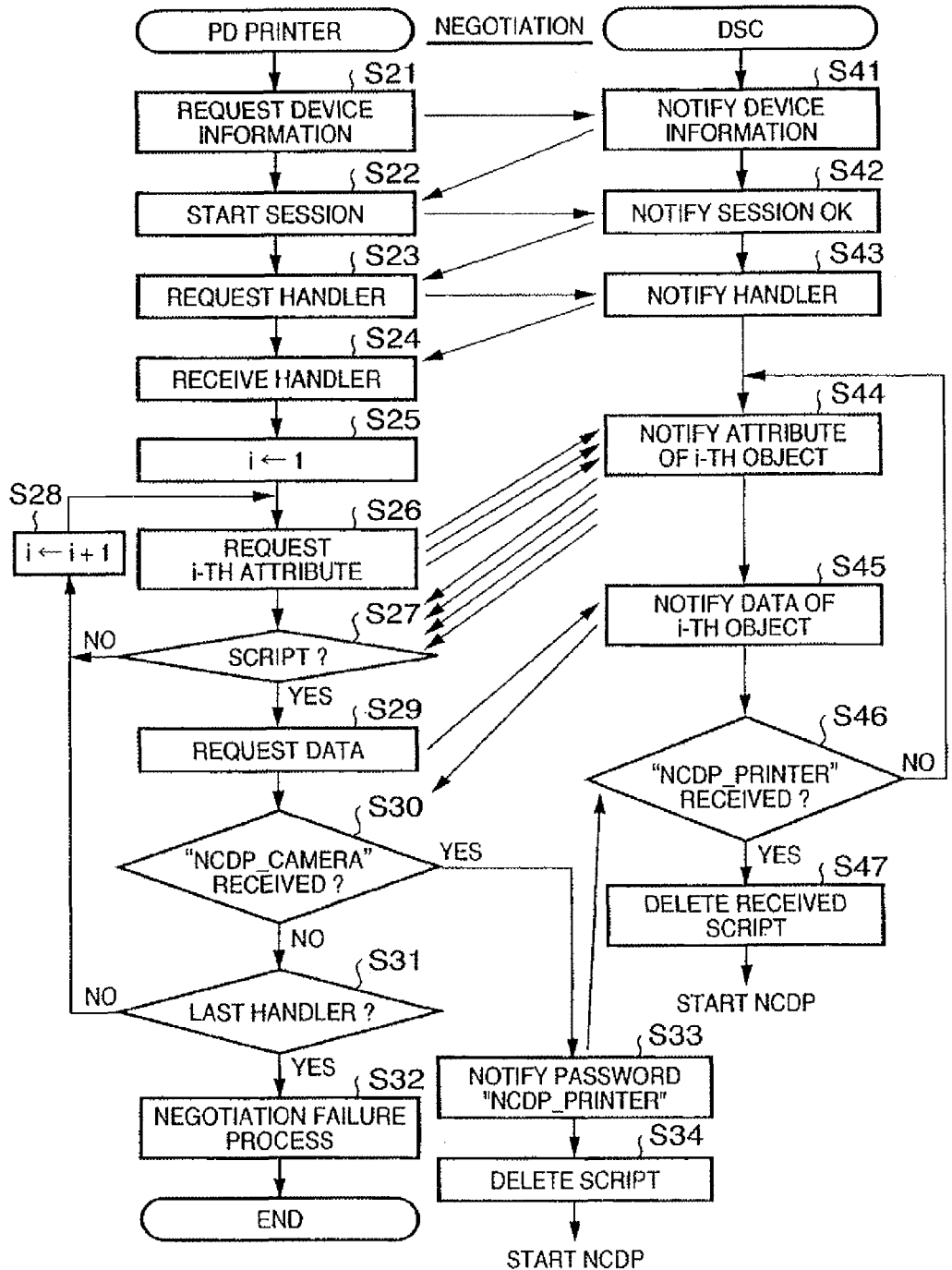
FIG. 25 is a flow chart showing the negotiation procedure in the embodiment.

FIG. 25 is a flow chart showing the aforementioned procedures.

The PD printer apparatus (to be simply referred to as PD hereinafter) 1000 outputs a device information request (GetDeviceInfo) to the DSC 3012 in step S21 (the DSC notifies the PD 1000 of information indicating the self device attribute in step S41 in response to this request (DeviceInfoDataset)).

The PD 1000 declares the start of a session (OpenSession) in step S22. The DSC 3012 receives this declaration, and notifies the PD 1000 of OK in step S42.

The PD 1000 requests handles of objects held by the DSC 3012 (GetObjectHandles) in step S23. In response to this request, the DSC 3012 notifies the PD 1000 of objects (images and scripts) held by itself (ObjectHandleArray) in step S43, and the PD 1000 receives that information (step S24).

Since the PD 1000 can detect the number of handles from the received information, it substitutes "1" in variable i indicating a handle as an initial value in step S25 first, and requests an attribute of the i-th object (GetObject(Handle i)) in step S26. As a result, since the DSC 3012 transmits the attribute of the corresponding object (ObjectInfo Dataset), the PD 1000 receives it, and checks if that object is a script (step S27). If it is determined that the corresponding object is other than a script (sensed image), the PD 1000 increments variable i by 1 in step S28, and repeats the process in step S26.

If it is determined that the i-th object is a script, the flow advances to step S27 to request the DSC to transfer the contents of the i-th object (GetObject(Handle i)). That is, this request is sent in anticipation of a password (word). As a result, since the DSC 3012 notifies the PD 1000 of the contents of the designated object (Object i Data) in step S45, the PD 1000 checks if the contents are password "NCDP_CAMERA" (step S29). If it is determined that the contents are not password "NCDP_CAMERA", but another script is sent back inadvertently, the PD 1000 checks in step S31 if variable i indicates the last handler. If NO in step S31, the flow returns to step S28 to repeat the above processes. If the PD 1000 determines that the DSC does not notify password "NCDP_CAMERA" after the last hander has been reached, it determines that the connected DSC 3012 is an NCDP incompatible digital camera. In order to abort subsequent processes, the PD 1000 turns on an LED equipped on its control to notify an error, or displays a message indicating a negotiation failure, thus ending this process.

On the other hand, if the PD 1000 receives password "NCDP_CAMERA" from the DSC, the flow advances to step S33. In step S33, the PD 1000 sends a script that describes password "NCDP_PRINTER" to the DSC 3012 (SendObject) via a procedure (transmission of SendObjectInfo and reception of OK) indicating that the PD 1000 is compatible to NCDP (S33). Since the script received from the DSC 3012 is no longer required, the PD 1000 deletes that script, and starts the NCDP mode.

If it is determined that password "NCDP_PRINTER" is received (step S46), the flow advances to step S47, and the DSC 3012 deletes the script received from the PD 1000 and starts the NCDP mode.

The processing sequence of negotiation has been described. Note that the above example corresponds to the case wherein both the PD printer apparatus 1000 and DSC 3012 support NCDP.

Since negotiation in this embodiment uses PTP, even a digital camera having an NCDP incompatible USB connection function executes the processes from step S41 to steps S44, S45, and S46. However, since the process in step S45 is not present, it is determined that received data is insignificant data (script), and that data is simply received and saved to repeat steps S44 and S45.

It is particularly noted that the transmission source of the password on the basis of the script request of the PD printer 1000 is always the DSC 3012 side (even when the DSC 3012 is incompatible to NCDP, it transmits the first script). That is, the PD printer apparatus 1000 side issues password "NCDP_PRINTER" in response to password "NCDP_CAMERA", and only when the PD printer apparatus 1000 receives first password "NCDP_CAMERA", it issues password "NCDP_PRINTER" in response to that password.

Upon adopting such procedures, if the PD printer apparatus 1000 issues the password first, no problem is posed when the DSC 3012 is compatible to NCDP. However, if the DSC 3012 is incompatible to NCDP, since the flow cannot advance to the process in step S47, it endlessly receives and stores insignificant script files (junk files).

As described above, since the PD printer 1000 sends a request to the DSC, the DSC side outputs first authentication information (the above password or word) upon mutual authentication, and the PD printer apparatus 1000 outputs authentication information in response to that information, a device connected to the PD printer apparatus 1000 can be prevented from accumulating junk files irrespective of its type. This is because the PD printer apparatus 1000 does not output authentication information if a script received from the DSC does not contain any expected authentication information. Especially, since a request from the device (the PD printer 1000 in this case) that transmits authentication information next is sent to the DSC as the device that transmits authentication information first, the PD printer 1000 need not recognize the script obtained as a response to that request to be a junk file.

With the above process, since an NCDP compatible digital camera holds a script that describes a password, transition to the NCDP print system is guaranteed. However, as can be easily seen from the above description, in order to shorten the negotiation time, a script that contains authentication information (word) is preferably assigned to an object with a handle number, which is requested earlier, of those of the DSC 3012 side. In this embodiment, if the DSC 3012 is compatible to NCDP, and receives a handle request (GetObjectHandles), it assigns handle number "1" to a script (authentication information) including the word, assigns subsequent handle numbers to images which have been sensed, stored, and held, and notifies the PD printer apparatus 1000 of that assignment result. In this way, the earliest shift to NCDP is expected.

As a result, the loop processes of steps S26 to S28 or those of steps S26 to S31 and S28 can be substantially omitted, and the flow can advance to steps S33 and S34 at once, thus achieving high-speed negotiation.

Figure 27:
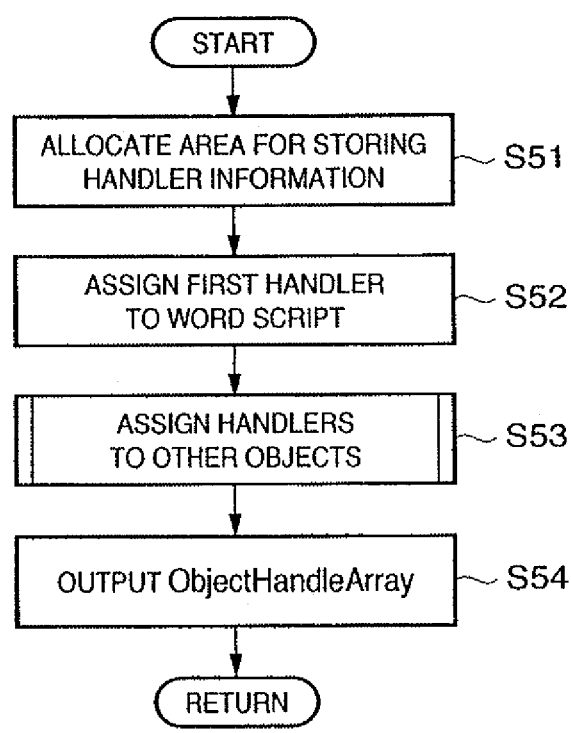
FIG. 27 is a flow chart showing the processing sequence on the DSC side upon receiving an inquiry (GetObjectHandles) of objects possessed by the digital camera DSC in the embodiment.

As the process on the DSC 3012 side, for example, a sequence shown in FIG. 27 can be adopted (a program of this sequence is stored in the ROM 32 in the DSC 3012). Note that the process in FIG. 27 is executed when a handle request command (GetObjectHandles) is received from the PD printer apparatus 1000, and is called from a host process upon reception of that command. Hence, note that whether or not GetObjectHandles is received has already been determined by the host process.

In step S51, a table (or a variable area) used to store objects and handles in correspondence with each other is allocated in the RAM 33. The flow advances to step S52, and an object that describes a script indicating NCDP compatibility is set in the table to assign it to the first handle. After that, handlers are assigned to remaining objects (normally, sensed image data that have been stored and held) and are set in the table. The result is then sent to the PD printer apparatus 1000 as ObjectHandleArray.

As a result, the DSC 3012 and PD printer apparatus 1000 can share (commonize) information upon designating objects. In the subsequent processes, objects in the DSC 3012 are exchanged using handles.

When the PD printer apparatus 1000 determines whether or not an object of the DSC 3012 is a script in an order tracing back from the last handle, the DSC 3012 can assign a script including a password to the last handle upon notifying the PD printer apparatus 1000 of handles.

Note that it is most effective to assign the first handle number to an object that describes a script indicating NCDP compatibility. However, the first handle number need not always be assigned, and it is sufficiently effective if a number near the first number is assigned. That is, as long as the last number is not assigned to an object that describes a script indicating NCDP compatibility, higher-speed negotiation can be attained compared to the case wherein the last number is assigned.

[ProcedureStart]

Figure 15:
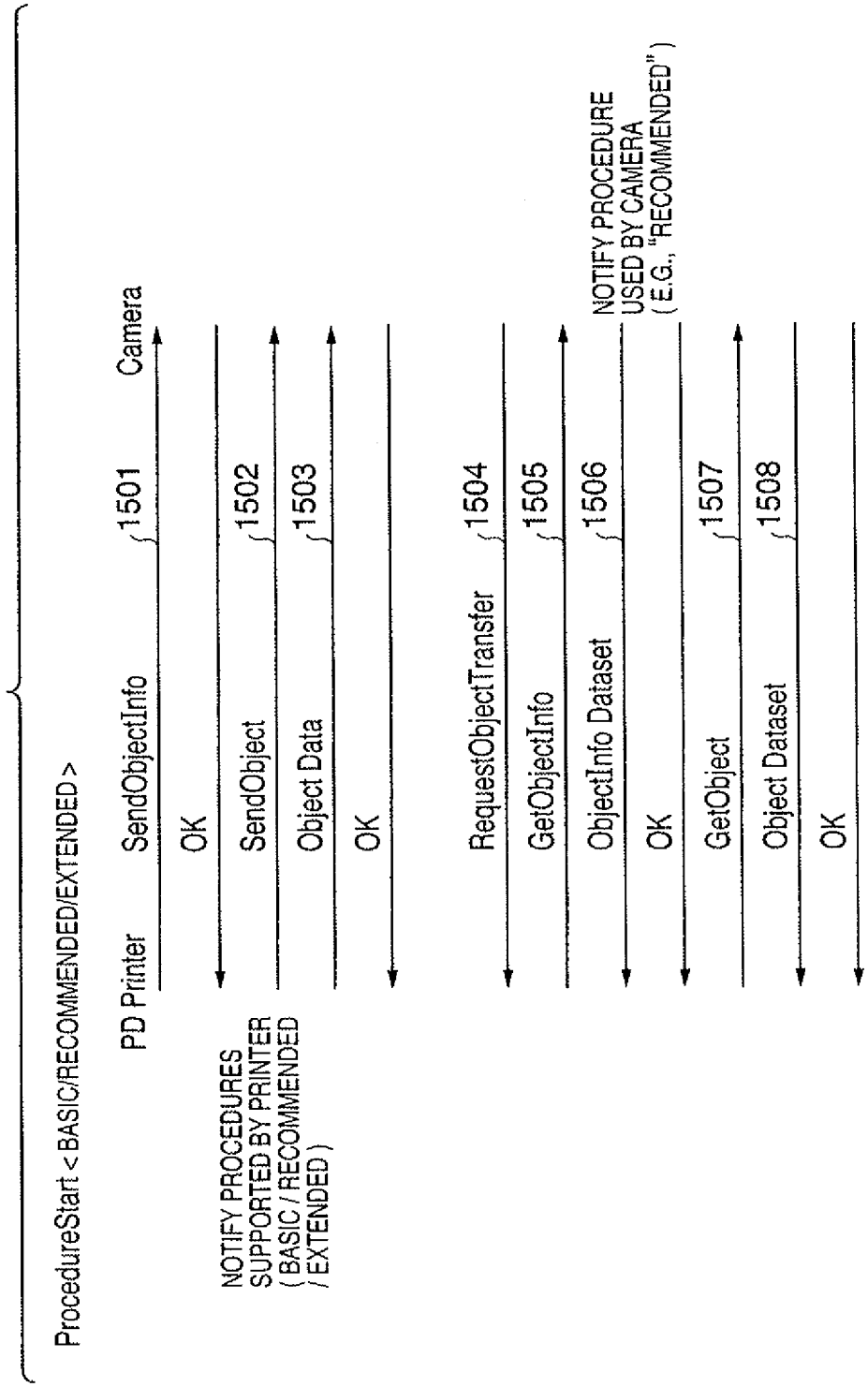
FIG. 15 is a view for explaining an example wherein a procedure (ProcedureStart) that receives a transition command from the camera to respective procedures is implemented using the PTP architecture.

FIG. 15 is a view for explaining an example wherein a command (ProcedureStart) used to start a given mode upon reception of a command that designates a start procedure to that mode from the DSC 3012 is implemented using the PTP architecture.

In order to notify the DSC 3012 of procedures "basic procedure", "recommended procedure", and "extended procedure" supported by the PD printer apparatus 1000, the printer apparatus notifies the DSC 3012 of the presence of object information to be sent to it using PTP command SendObjectInfo (1501). Upon reception of an affirmative response (OK) from the DSC 3012 in response to this command, the printer apparatus sends a message indicating that it is ready to transmit an object to the DSC 3012 using PTP command SendObject (1502), and then transmits information associated with the procedures supported by the PD printer apparatus 100 using ObjectData (1503). The DSC 3012 issues event message RequestDataTransfer defined by PTP to the PD printer apparatus 1000 (1504) to notify the printer apparatus that a PTP command GetObject Operation is to be launched. In response to this message, when the PD printer apparatus 1000 sends a message indicating that it is ready to receive information associated with object information (GetObjectInfo) (1505), that information is returned using ObjectInfo Dataset (1506). When object information itself is requested by designating the object information (1507), the DSC 3012 informs the PD printer apparatus 1000 of procedures ("basic", "recommended", "extended", and the like) that the DSC 3012 uses by Object Dataset (1508).

In this manner, the DSC 3012 can designate an image print mode of the PD printer apparatus 1000.

[NCDPEnd]

Figure 16:
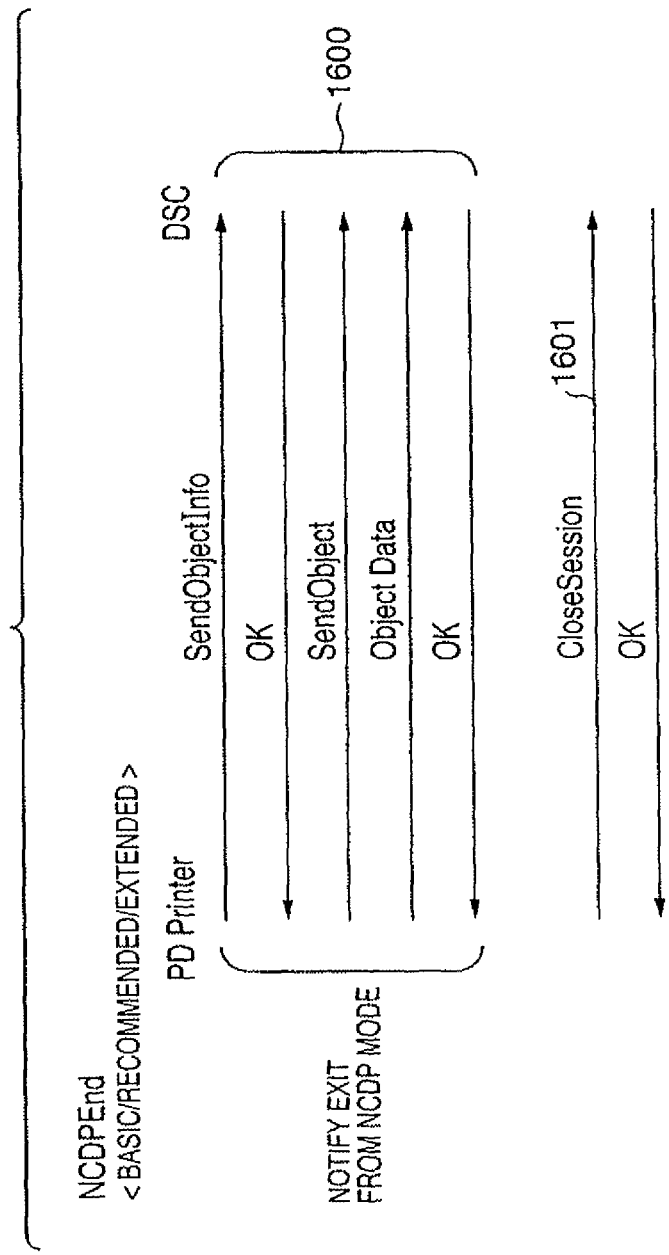
FIG. 16 is a view for explaining an example wherein a command (NCDPEnd) that instructs to end the NCDP procedure is implemented using the PTP architecture.

FIG. 16 is a view for explaining an example wherein a command (NCDPEnd) used to end the NCDP communication control procedures in this embodiment is implemented using the PTP architecture.

In this procedure, the PD printer apparatus 1000 informs the DSC 3012 of the presence of object information to be sent to it (1600), and notifies the DSC 3012 that it leaves the NCDP mode using ObjectData. Upon reception of an affirmative response (OK) in response to this command, PTP command CloseSession is transmitted (1601) to end this communication. In this way, the NCDP communication procedures end.

[Capability]

Figure 17:
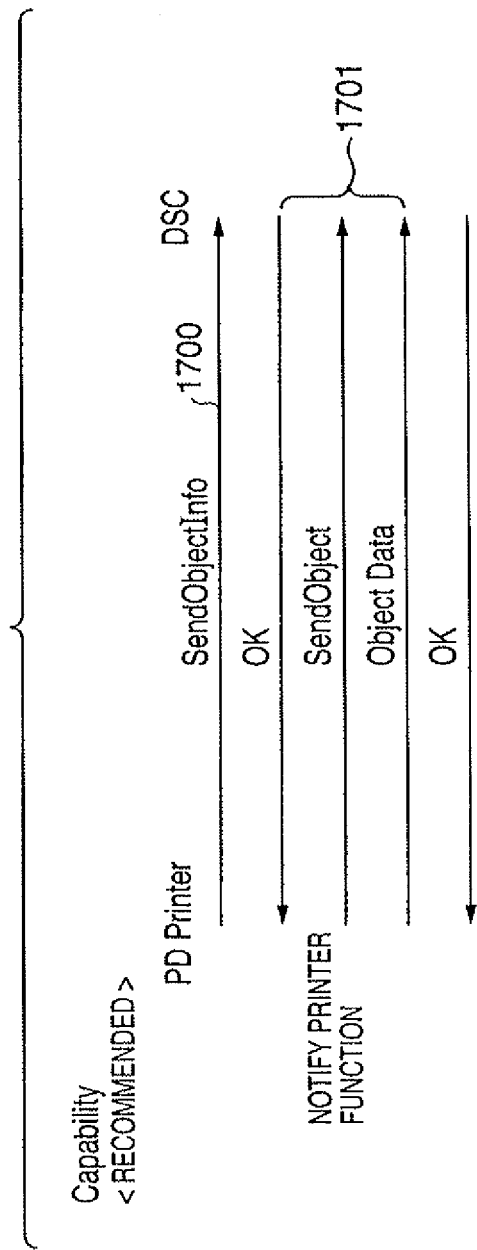
FIG. 17 is a view for explaining an example wherein a command (Capability) that transmits Capability from the PD printer apparatus to the camera in the NCDP procedure is implemented using the PTP architecture.

FIG. 17 is a view for explaining an example wherein communication procedures in a Capability command used to notify the DSC 3012 of the functions of the PD printer apparatus 1000 in NCDP of this embodiment are implemented using the PTP protocol.

In this procedure, the PD printer apparatus 1000 informs the DSC 3012 of the presence of object information to be sent to it using PTP command SendObjectInfo (1700). Then, the printer apparatus notifies the DSC 3012 that it is ready to transmit object information using PTP command SendObject, and then transmits the functions of the PD printer apparatus 1000 to the DSC 3012 in a script format (FIG. 12) using Object Data (1701).

[GetImage]

Figure 18:
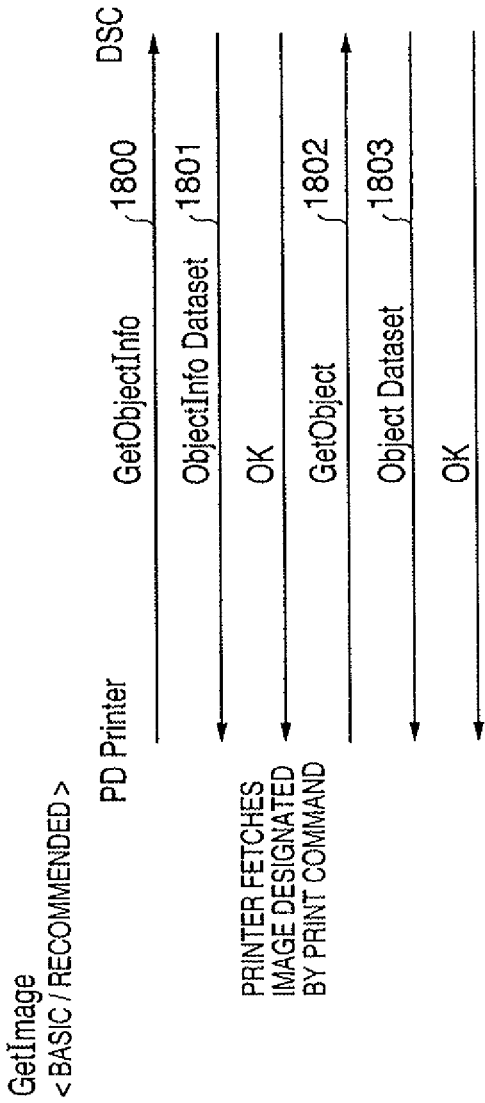
FIG. 18 is a view for explaining an example wherein a procedure of a command (GetImage) that acquires an image file held in the camera from the PD printer apparatus in the NCDP procedure is implemented using the PTP architecture.

FIG. 18 is a view for explaining an example wherein communication procedures when the PD printer apparatus 1000 acquires image data (JPEG image) held by the DSC 3012 (GetImage) are implemented using the PTP protocol.

Upon sending a request of information associated with an object held by the DSC 3012 (1800), the DSC 3012 sends information (Object Dataset) associated with that object to the PD printer apparatus 1000 (1801). When an acquisition request (GetObject) is issued by designating that object (1802), the DSC 3012 transmits the requested image file (Object Dataset) to the PD printer apparatus 1000 (1803). In this way, the PD printer apparatus 1000 can acquire a desired image file from the DSC 3012.

[StatusSend]

Figure 19:
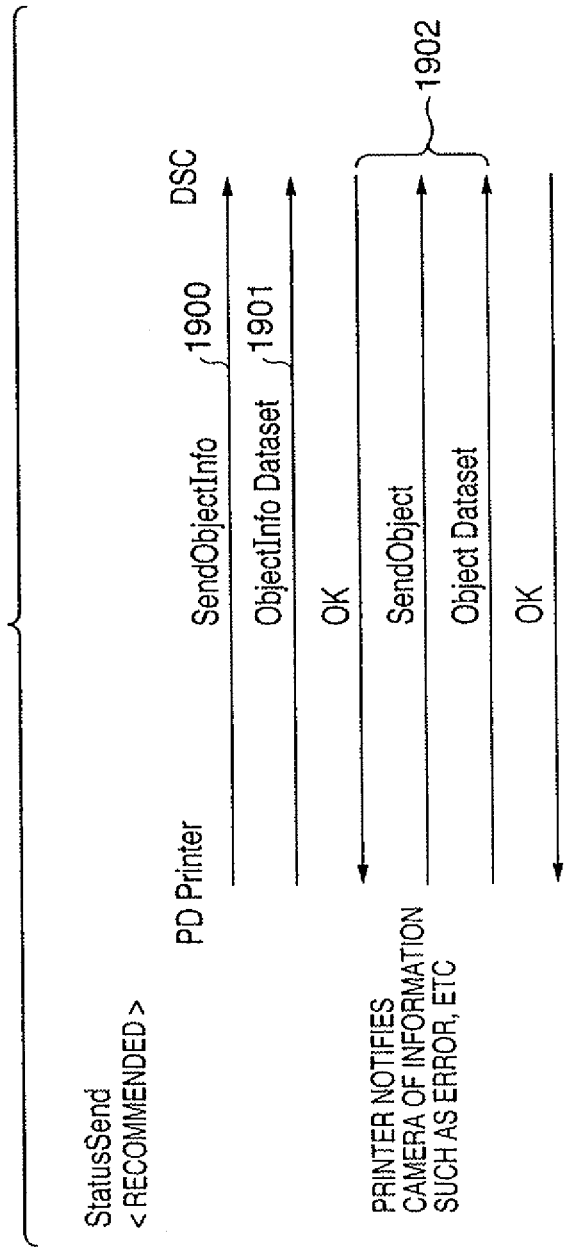
FIG. 19 is a view for explaining an example wherein a procedure of a command (StatusSend) that transmits error status from the PD printer apparatus to the camera in the NCDP procedure is implemented using the PTP architecture.

FIG. 19 is a view for explaining an example wherein communication procedures when the PD printer apparatus 1000 notifies the DSC 3012 of error status or the like (StatusSend) in NCDP of this embodiment are implemented using the PTP protocol.

The PD printer apparatus 1000 notifies the DSC 3012 of the presence of object information to be sent to it using PTP command SendObjectInfo (1900). Then, the printer apparatus transmits an information set (Object Dataset) associated with that object information to the DSC 3012 (1901). In response to an affirmative response (OK) from the DSC 3012, status information of errors or the like in the PD printer apparatus 1000 is transmitted using PTP commands SendObject and Object Dataset.

[PageEnd]

Figure 20:
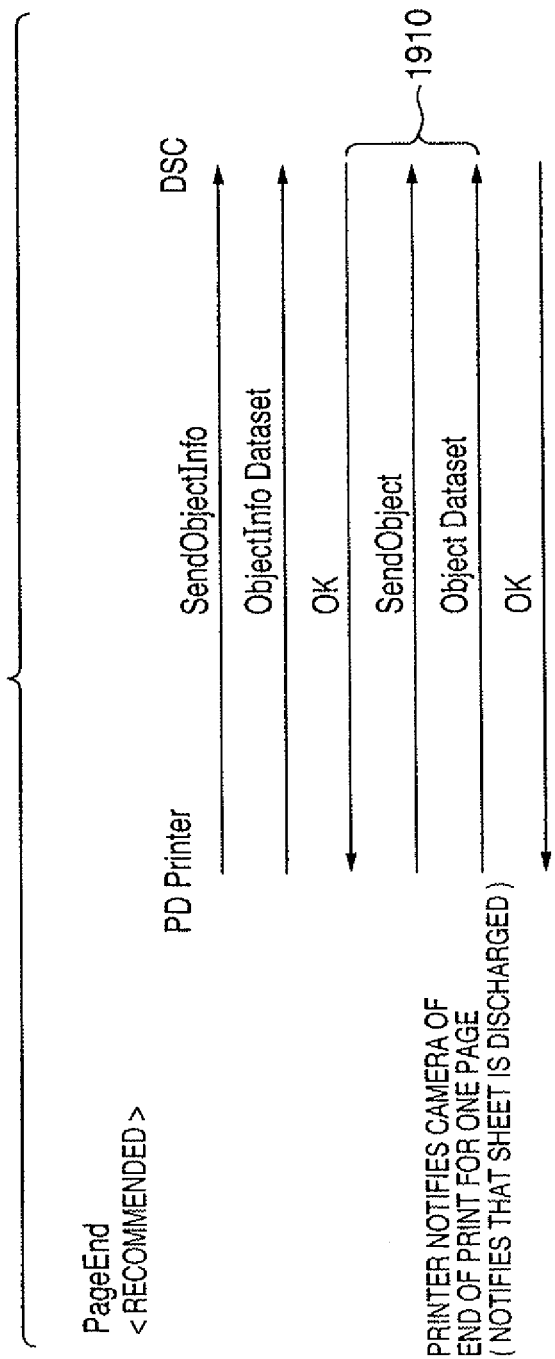
FIG. 20 is a view for explaining an example wherein a procedure of a command (PageEnd) that transmits end of a print process for one page from the PD printer apparatus to the camera in the NCDP procedure is implemented using the PTP architecture.

FIG. 20 is a view for explaining an example wherein communication procedures when the PD printer apparatus 1000 notifies the DSC 3012 of the end of a print process for one page (PageEnd) in NCDP of this embodiment are implemented using the PTP protocol.

[JobEnd]

Figure 21:
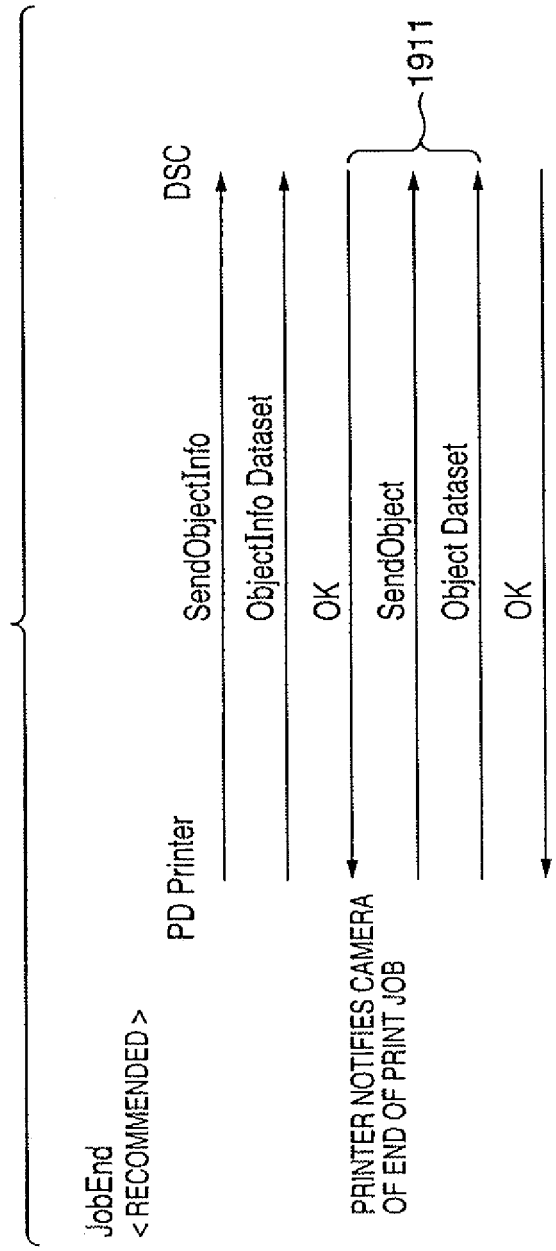
FIG. 21 is a view for explaining an example wherein a procedure (JobEnd) that issues an end command of a print job from the PD printer apparatus to the camera in the NCDP procedure is implemented using the PTP architecture.

FIG. 20 is a view for explaining an example wherein communication procedures when the PD printer apparatus 1000 notifies the DSC 3012 of the end of a print job (JobEnd) in NCDP of this embodiment are implemented using the PTP protocol. In FIGS. 20 and 21, after execution of procedures 1900 and 1901 in FIG. 19, the PD printer apparatus 1000 notifies the DSC 3012 of the end of the print process for one page (1910 in FIG. 20), and the PD printer apparatus 1000 notifies the DSC 3012 of the end of the print job (1911 in FIG. 21).

[JobStart]

Figure 22:
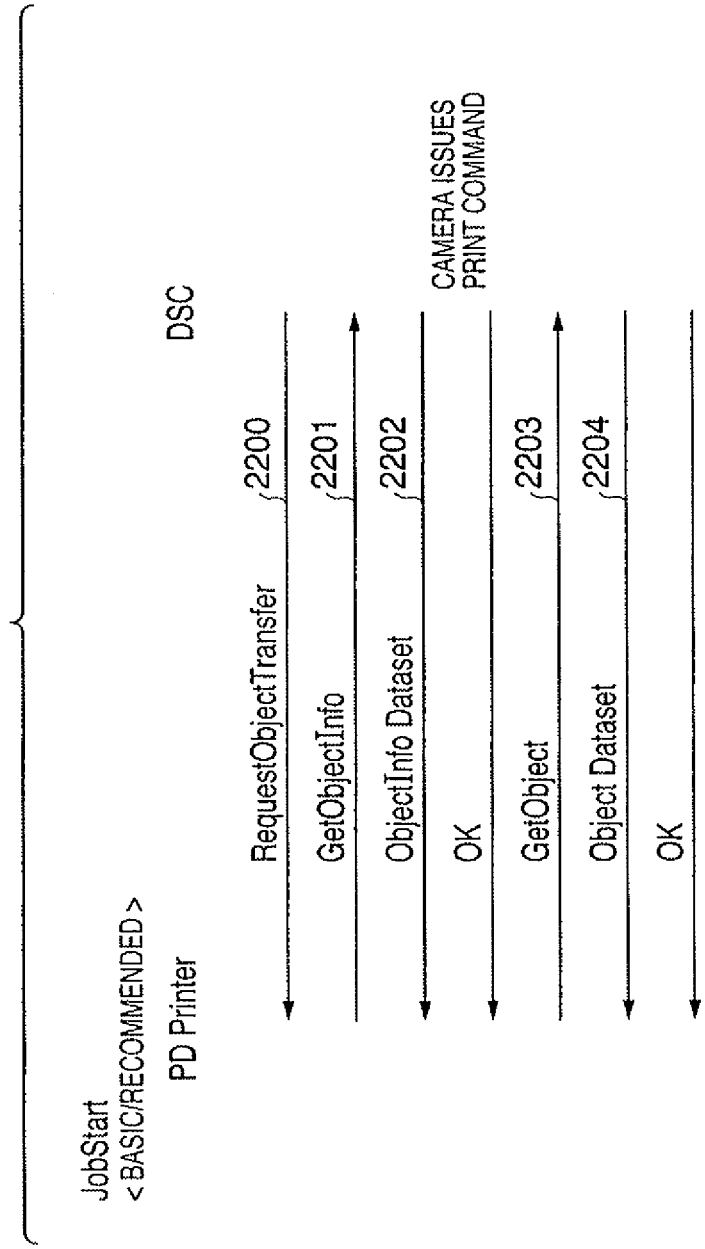
FIG. 22 is a view for explaining an example wherein a procedure (JobStart) that issues a print command from the camera to the PD printer apparatus in the NCDP procedure is implemented using the PTP architecture.

FIG. 22 is a view for explaining an example wherein communication procedures when the DSC 3012 notifies the PD printer apparatus 1000 of the start of a print job (JobStart) in NCDP of this embodiment are implemented using the PTP protocol.

The DSC 3012 sends event message RequestObjectTransfer defined by PTP to the PD printer apparatus 1000 (2200) so as to urge the PD printer apparatus 1000 to issue PTP command GetObject. As a result, when the PD printer apparatus 1000 issues PTP command GetObjectInfo (2201), the DSC 3012 transmits information associated with object information to be transmitted. In response to this information, when the PD printer apparatus 1000 requests object information (GetObject: 2203), Object Dataset is transmitted to issue a print command from the DSC 3012 to the PD printer apparatus 1000 (2204).

[JobAbort]

Figure 23:
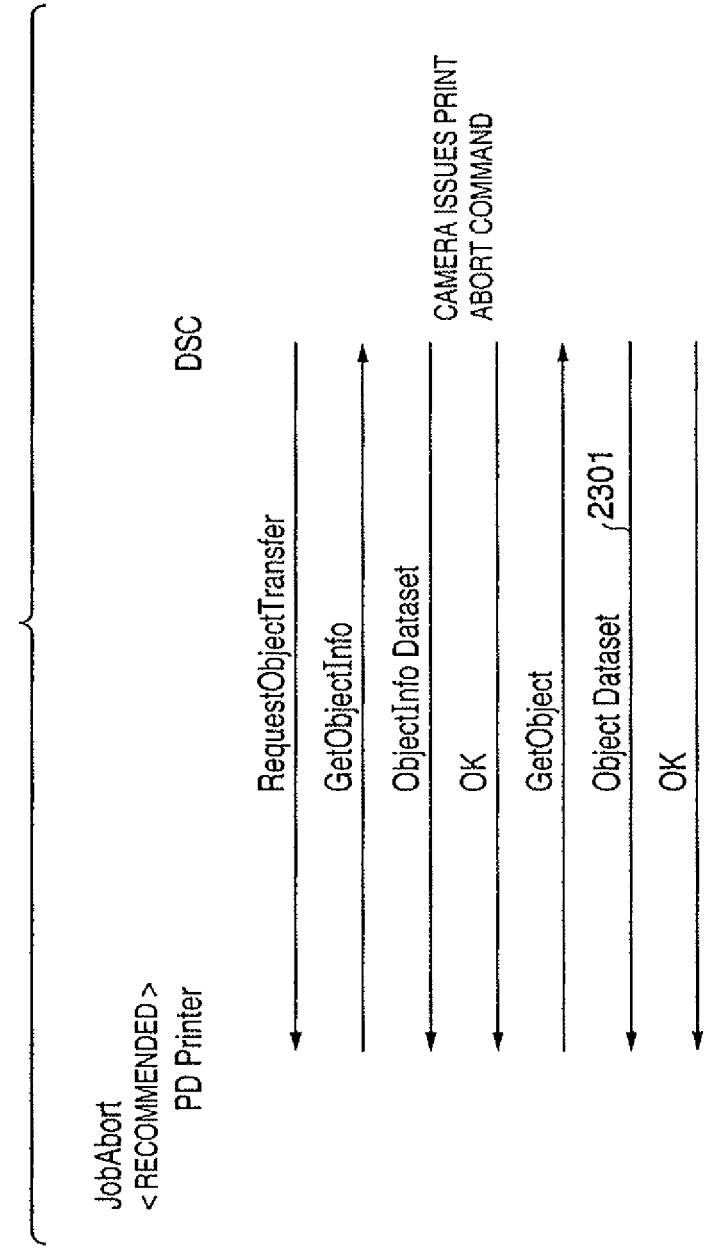
FIG. 23 is a view for explaining an example wherein a procedure (JobAbort) that issues a print abort command from the camera to the PD printer apparatus in the NCDP procedure is implemented using the PTP architecture.

FIG. 23 is a view for explaining an example wherein communication procedures when the DSC 3012 issues a print abort command to the PD printer apparatus 1000 (JobAbort) in NCDP of this embodiment are implemented using the PTP protocol.

[JobContinue]

Figure 24:
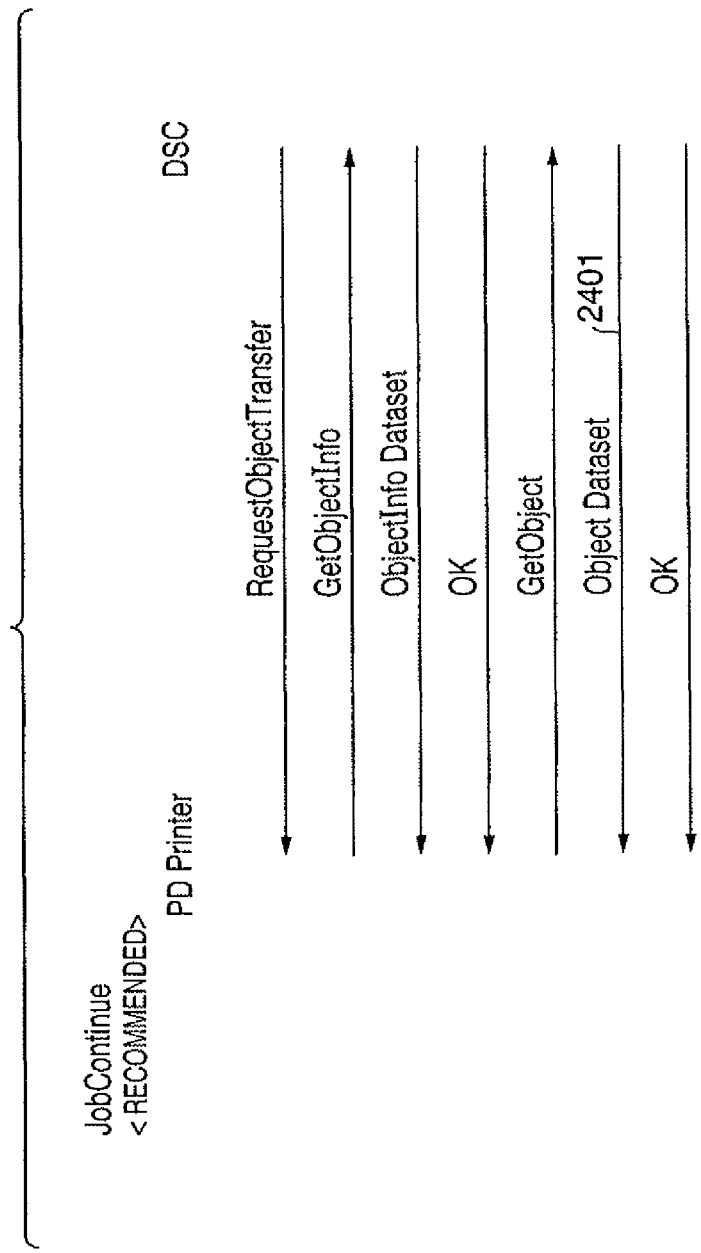
FIG. 24 is a view for explaining an example wherein a procedure (JobContinue) that issues a print restart command from the camera to the PD printer apparatus in the NCDP procedure is implemented using the PTP architecture.

FIG. 24 is a view for explaining an example wherein communication procedures when the DSC 3012 issues a print restart command to the PD printer apparatus 1000 (JobContinue) in NCDP of this embodiment are implemented using the PTP protocol.

In FIGS. 23 and 24, after procedures 2200 to 2203 in FIG. 22 are executed, the DSC 3012 issues a print abort command to the PD printer apparatus 1000 (2301 in FIG. 23), and sends a print restart command to the PD printer apparatus 1000 (2401 in FIG. 24).

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of software that can implement the functions (processes to be executed on the camera side, various print processes executed on the printer side) of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

In the above description, since a handle number that is to be exchanged at an earliest possible timing is assigned to authentication information, the shift time to the camera direct process is shortened.

However, upon making an authentication process with a device which has no camera direct function, all pieces of handle number information must be exchanged, and it takes a long time to determine an authentication failure.

To solve this problem, a device having a camera direct function preferably assigns a handle number within the range of a predetermined number from a number to be information-exchanged early to authentication information. (For example, it is specified to assign one of handle numbers "1" to "10" to authentication information in the above embodiment. When information is exchanged in descending order of number, a number within 10 numbers from the maximum number is assigned.) In this way, an authentication failure can be determined quickly.

The predetermined number of handle numbers is not limited to 10. However, the device which transmits authentication information first and that which transmits authentication information second preferably use common numbers.

With this arrangement, even when the first handle number of the DSC cannot be assigned to authentication information, since a smallest possible handle number can be assigned to authentication information, the freedom in design is not so restrained. When authentication information cannot be exchanged, that fact can be recognized quickly.

As described above, according to this embodiment, the PD printer apparatus is set as a USB host, the DSC is set as a USB device, the PD printer apparatus transmits information associated with its Capability to the DSC prior to a print operation, and the DSC can determine an optimal print mode based on that Capability information upon issuing a print command.

Since the Capability information is transmitted using a script, that information can be easily exported to other communication protocols, thus allowing easy standardization.

Since communication procedures between devices are made using a versatile files and versatile format, and a communication protocol layer of an application according to this embodiment is specified as an upper layer, communication procedures independent of various interface specifications can be specified.

In the above embodiment, upon forming the photo direct print system, the printer apparatus serves as a USB host and the DSC serves as a USB device. As described above, as a result of examination of the circumstances that most of recent digital cameras have a USB device function to communicate with a PC, if the number of digital camera manufacturers is larger than that of printer manufacturers, and a host device need not trouble about a power supply, when the printer side serves as a host, the load on the manufacturers can be reduced, the manufacturers can sufficiently enjoy merits upon building a system as the object of the present invention, and such system is preferable for end users.

In the above embodiment, as direct communication means between the digital camera and printer, direct connection using the USB cable has been exemplified. For example, since a direct communication can also be made by a wireless communication such as Bluetooth or the like, the present invention is not limited to the above example.

As described above, according to the present invention, an authentication procedure that can avoid unnecessary information from being stored in a digital camera can be made irrespective of whether or not a digital camera connected to a printer has the direct print function.

Upon building the photo direct print system, information transfer efficiency of the system can be improved, and an image that the user wants to print can be printed in a short response time.

Since information exchange is described in a script, functional differences among manufacturers can be absorbed. Even when new functions are added to one or both of the printer and digital camera, since a communication itself can be diverted, a flexible communication can be made.

As many apparently widely different embodiments of the present invention can be made without departing from the spirit and scope thereof, it is to be understood that the invention is not limited to the specific embodiments thereof except as defined in the claims.

The invention claimed is:

1. A digital camera which stores an image sensed by an image sensing unit into a storage medium and has a user interface including a button for instructing printing of the image, comprising:
    a communication unit constructed to communicate with a print apparatus using a Picture Transfer Protocol (PTP);
    a first reception unit constructed to receive, from the print apparatus, a transfer request command having a format including a number specifying uniquely one of a plurality of information being managed by the digital camera, in response to the start of communication with the print apparatus by said communication unit, where the digital camera assigns a unique number to each of the plurality of information;
    a sending unit constructed to select one of the plurality of information being managed by the digital camera according to the number included in the transfer request command received by said first reception unit, and send, to the print apparatus, the selected information;
    a second reception unit constructed to receive information from the print apparatus after said sending unit sends the information including a password indicating that the digital camera has a direct print function;
    a recognition unit constructed to recognize that the print apparatus is a print apparatus having the direct print function if the information received by said second reception unit includes a password indicating that the print apparatus has a direct printing function and to delete the information received by said second reception unit; and
    a third reception unit constructed to receive, from the print apparatus, capability information as a script in which a list of functions of the print apparatus are described after said second reception unit receives information including the password indicating that the print apparatus has a direct printing function,
    wherein the user interface can select one of functions described in the capability information received by said third reception unit.

2. A method of controlling a digital camera which stores an image sensed by an image sensing unit into a storage medium and has a user interface including a button for instructing printing of the image and a communication unit constructed to communicate with a print apparatus using a Picture Transfer Protocol (PTP), said method comprising:
    a first reception step of receiving, from the print apparatus, a transfer request command having a format including a number specifying uniquely one of a plurality of information being managed by the digital camera, in response to the start of communication with the print apparatus by said communication unit, where the digital camera assigns a unique number to each of the plurality of information;
    a sending step of selecting one of the plurality of information being managed by the digital camera according to the number included in the transfer request command received in said first reception step, and sending to the print apparatus the selected information including a keyword indicating that the digital camera has a direct print function;
    a second reception step of receiving information from the print apparatus after the information including a password indicating that the digital camera has a direct print function is sent in said sending step;
    a recognition step of recognizing that the print apparatus is a print apparatus having the direct print function if the information received in said second reception step includes a password indicating that the print apparatus has a direct printing function and to delete the information received by said second reception step; and
    a third reception step of receiving, from the print apparatus, capability information as a script file in which a list of functions of the print apparatus are described after information including the password indicating that the print apparatus has a direct printing function is received in said second reception step,
    wherein the user interface can select one of functions described in the capability information received in said third reception step.

3. A print apparatus communicating directly with a digital camera which is used as a user interface device including a button for instructing printing, to receive and print an image managed by the digital camera, comprising:
    a communication unit constructed to communicate with a digital camera using an information transfer command including a number specifying uniquely information among a plurality of information managed by the digital camera in order to acquire the information from the digital camera, where the digital camera assigns a unique number to each of the plurality of information;
    a request unit constructed to send, to the digital camera via said communication unit, an information transfer request of information managed by the digital camera in order to determine whether or not the digital camera is a device having a direct print function, in response to start of communication with the digital camera by said communication unit;
    a reception unit constructed to receive, from the digital camera, the information requested by said request unit; and
    a notification unit constructed to, if the information received by said reception unit includes a password indicating that the digital camera is the device having the direct print function, notify the digital camera of information including a password indicating that the print apparatus has the direct print function and to delete the information received by said reception unit,
    wherein, if the information received by said reception unit does not include the password indicating that the digital camera has a direct print function, the print apparatus terminates the negotiation with the digital camera without sending the information including the password indicating that the print apparatus has a direct printing function.

4. The apparatus according to claim 3, wherein said request unit requests information having a script attribute conforming with a XML format among the plurality of information managed by the digital camera.

5. The apparatus according to claim 3, further comprising a sending unit constructed to send, to the digital camera, capability information as a script file in which a list of functions of the print apparatus are described after said notification unit notifies the digital camera of the information including the password.

6. A method of controlling a print apparatus which has a communication unit constructed to communicate with a digital camera which is used as a user interface device including a button for instructing printing, receives and prints an image managed by the digital camera via said communication unit, where said communication unit is constructed to communicate with the digital camera using an information transfer command including a number specifying uniquely information among a plurality of information managed by the digital camera in order to acquire the information from the digital camera, where the digital camera assigns a unique number to each of the plurality of information, said method comprising:

a request step of sending, to the digital camera via said communication unit, an information transfer request of information managed by the digital camera in order to determine whether or not the digital camera is a device having a direct print function, in response to start of communication with the digital camera by said communication unit; and a reception step of receiving, from the digital camera, information requested in said request step; and a notification step of, if the information received in said reception step includes a password indicating that the digital camera is the device having the direct print function, notifying the digital camera of information including a password indicating that the print apparatus has the direct print function and of deleting the information received by said reception step, wherein, if the information received by said reception step does not include the password indicating that the digital camera has a direct print function, the print apparatus terminates the negotiation with the digital camera without sending the information including the password indicating that the print apparatus has a direct printing function.

7. The method according to claim 6, wherein in said request step, information having a script attribute conforming with a XML format among the plurality of information managed by the digital camera is requested.

8. The method according to claim 6, further comprising a sending step of sending, to the digital camera, capability information as a script file in which a list of functions of the print apparatus are described after said notification step notifies the digital camera of the information including the password.

* * * * *